United States Patent [19]
Cutting et al.

[11] Patent Number: 5,625,554
[45] Date of Patent: *Apr. 29, 1997

[54] FINITE-STATE TRANSDUCTION OF RELATED WORD FORMS FOR TEXT INDEXING AND RETRIEVAL

[75] Inventors: Douglass R. Cutting, Menlo Park; Per-Kristian G. Halvorsen, Los Altos; Ronald M. Kaplan, Palo Alto; Lauri Karttunen, Redwood City; Martin Kay, Menlo Park; Jan O. Pedersen, Palo Alto, all of Calif.

[73] Assignee: Xerox Corporation, Stamford, Conn.

[*] Notice: The portion of the term of this patent subsequent to May 2, 2012, has been disclaimed.

[21] Appl. No.: 916,576

[22] Filed: Jul. 20, 1992

[51] Int. Cl.$^6$ ............................................. G06F 17/30
[52] U.S. Cl. ............................................. 364/611
[58] Field of Search ............... 364/419.01, 419.07, 364/419.1, 419.11, 419.12, 419.05, 419.08, 419.3, 419.19

[56] References Cited

U.S. PATENT DOCUMENTS

| | | | |
|---|---|---|---|
| 4,672,571 | 6/1987 | Bass et al. | 364/900 |
| 4,701,851 | 10/1987 | Bass et al. | 364/419 |
| 4,912,671 | 3/1990 | Ishida et al. | 364/900 |
| 5,051,886 | 9/1991 | Kawaguchi et al. | 364/200 |
| 5,323,316 | 6/1994 | Kadashevich et al. | 364/419.01 |

FOREIGN PATENT DOCUMENTS

| | | | |
|---|---|---|---|
| 0283685 | 9/1988 | European Pat. Off. | G06F 15/20 |
| 0281742 | 9/1988 | European Pat. Off. | G06F 15/20 |
| 468402A2 | 1/1992 | European Pat. Off. | |

OTHER PUBLICATIONS

"Performance and Architectural Issues for String Matching" Isenman, M., et al., IEEE Transactions on Computers, vol. 39, No. 2, Feb. 1990, New York, U.S.A.

"State Machines Find the Pattern", Kimbrell, R.E., Computer Design, vol. 24, No. 5, May 1985, Littleton, Massachusetts, U.S.

Introduction to Automata Theory, Languages and Computation, Holcraft and Ullman, 1979, Addison–Wesley Publishing Co., pp. 64–76.

"Development of a Stemming Algorithm", J.B. Lovins, Mechanical Translation And Computational Linguistics, 11, pp. 22–31, Mar. 1968.

(List continued on next page.)

*Primary Examiner*—Donald E. McElheny, Jr.
*Assistant Examiner*—Hayward Verdun
*Attorney, Agent, or Firm*—Rosen, Dainow & Jacobs Limited Liability Partnership

[57] ABSTRACT

The present invention solves a number of problems in using stems (canonical indicators of word meanings) in full-text retrieval of natural language documents, and thus permits recall to be improved without sacrificing precision. It uses various arrangements of finite-state transducers to accurately encode a number of desirable ways of mapping back and forth between words and stems, taking into account both systematic aspects of a language's morphological rule system and also the word-by-word irregularities that also occur. The techniques described apply generally across the languages of the world and are not just limited to simple suffixing languages like English. Although the resulting transducers can have many states and transitions or arcs, they can be compacted by finite-state compression algorithms so that they can be used effectively in resource-limited applications. The invention contemplates the information retrieval system comprising the novel finite state transducer as a database and a processor for responding to user queries, for searching the database, and for outputting proper responses, if they exist, as well as the novel database used in such a system and methods for constructing the novel database.

24 Claims, 10 Drawing Sheets

OTHER PUBLICATIONS

"Finite-state Constraints" by Lauri Karttunen, International Conference on Current Issues in Computational Linguistics. Jun. 10–14, 1991. Universiti Sains Malaysia, Penang, Malaysia.

Kaplan, R.M. Phonological rules and finite-state transducers [Abstract]. *Linguistic Society of American Meeting Handbook*. Fifty-sixth Annual Meeting, Dec. 27–30, 1981. New York.

Koskenniemi, K. *Two–level Morphology. A General Computational Model for Word–Form Recognition and Production*. Department of General Linguistics. University of Helsinki. 1983.

Karttunen, L., K. Koskenniemi, and R.M. Kaplan. A compiler for Two–level Phonological Rules. In Dalrymple, M. et al. *Tools for Morphological Analysis*. Center for the Study of Language and Information. Stanford University. Palo Alto. 1987.

Kay, Martin. Nonconcatenative Finite State Morphology. Proceedings of the 3rd Conference of the European Chapter of the Association for Computational Linguistics. Copenhagen 1987.

Ashdown "Minimizing Finite State Machines", Embedded Systems Programming, Premiere 1988, pp. 57–66.

"An Algorithm For Suffix Stripping", M.F. Porter; Prog. 14, No. 3, pp. 130–137, Jul. 1980.

"The Theory of Machinery Computation", K. Kohavi, Ed., an article entitled An n log n Algorithm for minimizing States In a Finite Automan by Hopcroft, pp. 189–196, Academic Press, NY 1971.

Aho and Ullman "Principles of Compiler Design", Addison–Wesley, 1977, pp. 99–103, 114–117.

Tzoukermann, E. and M. Y. Liberman. M. A Finite–State Morphological Processor for Spanish. *Proceedings of the 13th International Conference on Computational Lingustics*. vol. 3.277–282. University of Helsinki. 1990.

Cutting, D., J. Kupiec, J. Pedersen, P. Sibun. A Practical Part–of–Speech Tagger. *Proceedings of the Third Conference on Applied Natural Language Processing*. Trento, Italy, Apr. 1992.

Ashdown, "Minimizing Finite State Machines", Embedded Systems Programming, Premiere, 1988, p. 59.

FINITE-STATE TRANSDUCTION OF RELATED WORD FORMS FOR TEXT INDEXING AND RETRIEVAL

RELATED APPLICATION

A commonly-assigned U.S. application Ser. No. 06/814,146, now abandoned, filed Dec. 27, 1985, entitled "ENCODING FSM DATA STRUCTURES", and continuation cases, U.S. Ser. Nos. 07/274,701, now abandoned; 07/619,821, now abandoned; and 07/855,129, now U.S. Pat. No. 5,450,598, filed respectively on Nov. 15, 1988; Nov. 29, 1990; Mar. 18, 1992.

BACKGROUND OF INVENTION

This invention relates to computerized information retrieval devices or systems, for text indexing and retrieval, databases for use in such information retrieval devices, and methods for making such databases.

All natural languages allow for common elements of meaning to be systematically represented by words that appear in different forms in free text. For example, in English, the common meaning of "arrive" is carried by the inflectional variants "arrived", "arrives", and "arriving" (as well as "arrive" itself), and by the derivational variant "arrival". The base word indicating the common element of meanings for all such variants is often called the stem, and the morphological analysis process of determining the stem from a variant form is often called stemming. The process of going the other way, from a stem to all its variant forms, is often called synthesis or generation.

Stemming can play an important role in full-text indexing and retrieval of natural language documents. Users who are primarily interested in indexing and retrieving text passages from documents according to their meanings may not want the variants of a common stem to be distinguished. Thus, if the user enters a query with the word "arriving", this can be treated as matching text passages that contain any of the words "arrive", "arrives", etc. This would have the important effect of improving recall without sacrificing precision.

However, stemming in the context of text indexing and retrieval has proven difficult to implement well, even for morphologically simple languages like English. Conventional techniques for English (e.g., "Development of a Stemming Algorithm" by J. B Lovins, Mechanical Translation and Computational Linguistics 11, pp. 22–31, March 1968; "An Algorithm for Suffix Stripping" by M. F. Porter; Program 14, No. 3, pp. 130–137, July 1980.) use "tail-cropping" algorithms to map words into canonical forms such as stems. Thus, rules or algorithms are written that strip off any of the systematically varying suffix letters to map every word to the longest prefix common to all variants. All the forms of "arrive", for example, would be stripped back to the string "arriv" (without an e), since this is the longest prefix that all the forms have in common (because the "e" does not appear in either "arriving" or "arrival"). Without special mechanisms to deal with exceptions, this strategy would also convert all the forms of "swim" back to "sw", since that is the longest invariant prefix.

This conventional strategy has several disadvantages. First, the resulting stem strings are frequently not words of English (sw, arriv). They cannot be presented to a naive user who might want to confirm that his query is being interpreted in a sensible way.

Second, this approach requires special mechanisms to deal with irregular inflection and derivation. Typically, an exception dictionary is provided for the most obvious and common cases (e.g. hear→heard, good→better), but the number of entries in this dictionary is usually restricted so that the resulting data-structures do not become too large. Accuracy suffers without a complete treatment of exceptional behavior, to the point where some researchers have concluded that stemming cannot significantly improve recall without substantially reducing precision.

Third, this is a one-way approach. It is good for mapping from words to stems, but cannot generate all the variant forms from a given stem. It provides appropriate search behavior if the stemming algorithm can be applied not only to the query, but also to the document texts themselves, either in advance of search in order to build an index or else on-the-fly so that the query-stem can be matched against the stemmed text-words. Thus, it is limited in its applicability to situations where the document database can be preprocessed for indexing (which would have to be redone whenever improvements are made to the stemmer) or where the time-penalty for stemming on the fly is not prohibitive.

Finally, this technique is not linguistically general. Entirely different algorithms would have to be written for each natural language, and even the general strategy of such algorithms must change to handle the properties of prefixing and infixing languages.

SUMMARY OF INVENTION

A principal object of the invention is a system of the type described which overcomes one or more of the disadvantages set forth above.

Another object of the invention includes systems capable not only of text indexing and retrieval using stemming, but also systems capable of significantly enhancing responses to user queries by employing stemming.

Further objects include systems of the type described above that can be implemented with moderate-sized databases providing shorter response times than known systems.

Still another object of the invention is a system capable of other types of automatic text processing applications.

Still further objects include improved databases for use in systems of the type described, and improved methods for constructing such databases.

The present invention solves a number of problems in using stems (canonical indicators of word meanings) in full-text retrieval of natural language documents, and thus permits recall to be improved without sacrificing precision.

In accordance with one aspect of the present invention, we have discovered that it is possible to map inflected forms of the same word, so-called variants, to the same canonical dictionary form or lexical representation. This applies to both regular and irregular forms.

According to this aspect of the invention, the mapping is obtained by means of a finite state transducer (FST). To our surprise, we have discovered that a single merged finite state transducer can be constructed that provides the desired mapping and that is of reasonable size and that provides a reasonable response time to queries. The surprise is that the single FST, representing the combination of possibly hundreds or thousands of smaller FSTs each with its own series of states, would have been expected to produce an FST of gigantic size which would be impractical if not impossible to use.

According to another aspect of the present invention, the single FST of modest size is the result of a combination of composition and intersection of the smaller FSTs created to fulfill the needs of the language.

As a result of the above discoveries, a number of important benefits ensue representing other aspects of the invention. The techniques described apply generally across the languages of the world and are not just limited to simple suffixing languages like English.

The merged FST in accordance with the invention can be created in a number of different ways providing a very flexible system applicable to different kinds of languages. It can include, for example, irregular forms without having to redo or modify existing databases.

The system of the invention is not limited to one mode of operation. It allows a stem to be computed from a given textual word, on the one hand, but it also allows all other variant forms for the given word's stem to be computed. These variants can be used to expand a query to increase the likelihood that an appropriate document will be found.

The concept of the invention is also applicable to composing a normalizing FST with a stemming FST into a single transducer that maps a stream of punctuated characters in text into a corresponding sequence of stems.

In accordance with still a further aspect of the invention, an FST is provided that is configured to associate words with affix and parts-of-speech tags as well as with stems, referred to herein as a morphological analyzer. In one embodiment, the FST is a character-based transducer allowing look-up and look-down operations. Such an analyzer is useful not only for text retrieval but also for other types of automatic text processing applications.

The present invention will be better understood from the detailed description given herein below in conjunction with the accompanying drawings, which give by way of illustration only and not by limitation, preferred embodiments in accordance with the present invention.

DETAILED DESCRIPTION OF PREFERRED EMBODIMENTS

To best understand our invention, please refer to the List of References ("List"), located at the end of this detailed description, which lists a number of references to explain many of the terms used herein. From time to time, reference will be made to those references by the bracketed numbers identifying them in the List. In particular, references [2], [3], [4], [6] and [8] are specifically incorporated herein by reference.

A feature of our invention is to construct and use in a text indexing and retrieval system a stored database comprising a finite-state transducer to represent all possible stem-variant relations of the system language. In particular, the finite state transducer in accordance with the invention defines the set of all possible textual or surface forms and maps that set to the set of corresponding lexical forms or stems.

Finite-state transducers (FSTs) are well-known devices for encoding sets of ordered-pairs of strings. For example, the set of pairs {<arrive arrive>, <arrive arriving>, <arrive arrived>, <arrive arrives>, <arrive arrival>} could be encoded in a simple FST. In general, an FST can be used to represent any "regular relation", which includes not only finite lists of ordered string-pairs as in this example, but also certain kinds of infinite collections of ordered pairs. Once the ordered pairs are encoded as an FST data-structure, that structure can be used by a computer processor to get all the items associated with any given input. Thus, given the stem "arrive", one can get all the various forms (generation), or given one of the variant forms (arrival), one can get its stem (arrive). If a given word may be a form of more than one stem (e.g. "found" as the past tense of "find" or the present of "found"), then the two correct stems will be provided.

Figure 2:
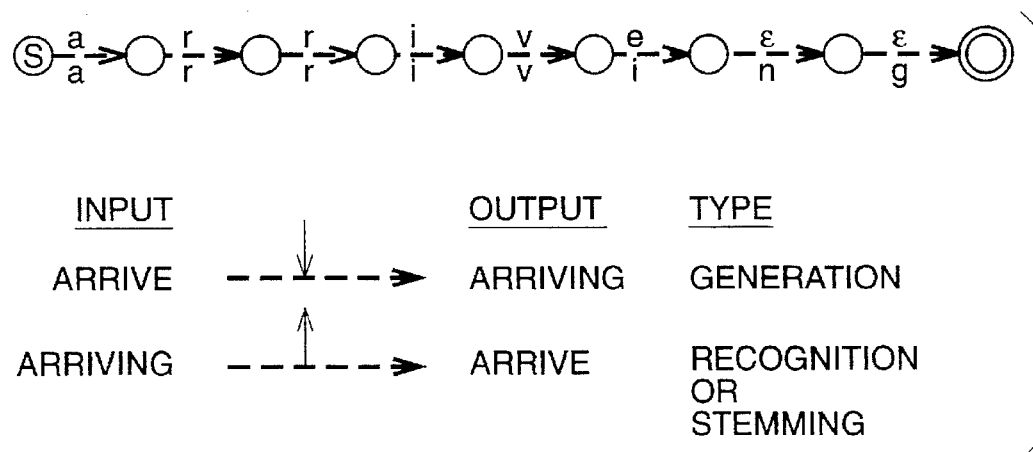
FIG. 2 is a sample FST mapping between stems and variants.

FIG. 2 illustrates how a two-level FST operates to map an inflected word to its lexical representation. In this case, it shows a simple FST that maps "arrive", the lexical representation or stem, to "arriving", one of its textual variants at the surface level.

Figure 10:
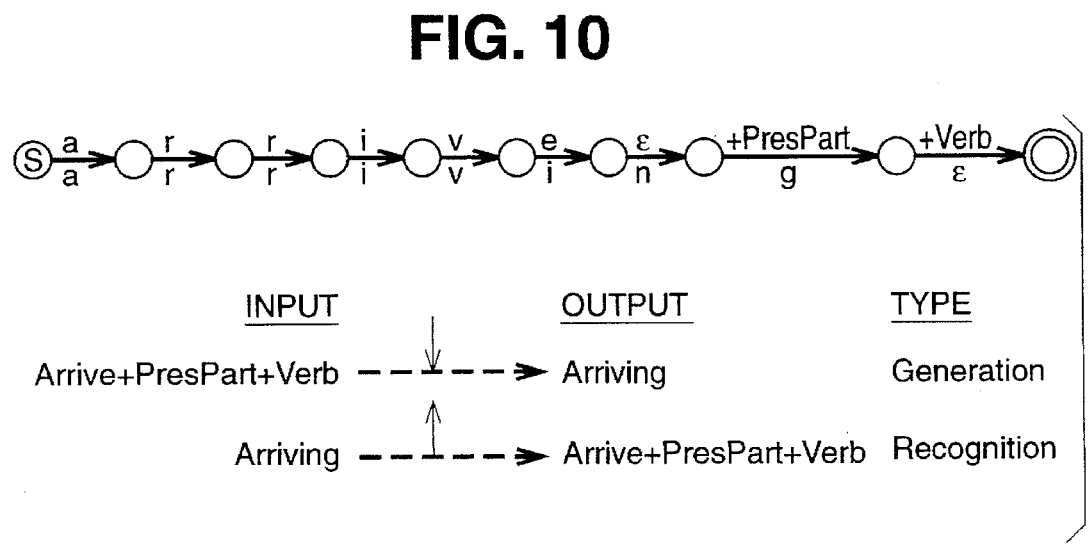
FIG. 10 is a simple FST mapping between words and stems plus part-of-speech and morphological affix tags.

The succession of states are represented by circles, with the start state labelled with an "s", and the end state with a double circle. The symbol ε at the end is Epsilon which acts as a NULL symbol to allow the FST to continue to process even if comparable characters are not present. See also reference [3]. Thus, for the simple situation depicted in FIG. 2, if the user inputs "arrive", the FST will output "arriving" in a look-down (or generational) operation. If the user inputs "arriving", the FST will output "arrive" in a look-up (recognition or stemming) operation. In this way, a single FST can easily be created to map between lower surface level words and their upper lexical representations. Similarly, a single FST can easily be created to perform the mapping of stems to variants defined by any language Rule as described, for example, in reference [3]. The lexical representation can include information about the part-of-speech, case, gender, number, and other morphological properties of the variant form. This information can be encoded in the lexical representation in the form of symbolic tags that form arc labels in the transducer in the same manner as ordinary letters do. For example, instead of mapping the form "arriving" only to the stem "arrive", as depicted in FIG. 2, we can add to the transducer an arc labeled with the morphological tag, +PresPart, to encode the information that "arriving" is the present participle form of "arrive". This is illustrated in FIG. 10. We call a transducer configured to associate words with affix and part-of-speech tags as well as with stems a "morphological analysis transducer" or "morphological analyzer". These transducers differ from ordinary stemming transducers only in the extra tag information included in the upper-side strings; they can be constructed, manipulated, compressed, and applied by exactly the same techniques and algorithms.

Figure 11A:
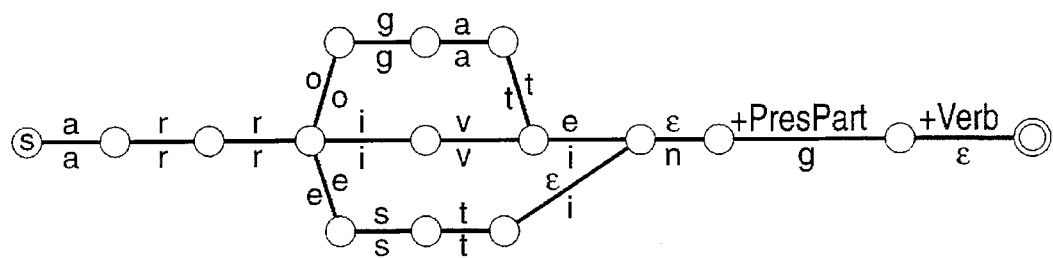
FIGS. 11A and 11B show how character-based FSTs can share more initial substring transistions than string-based FSTs.
Figure 11B:
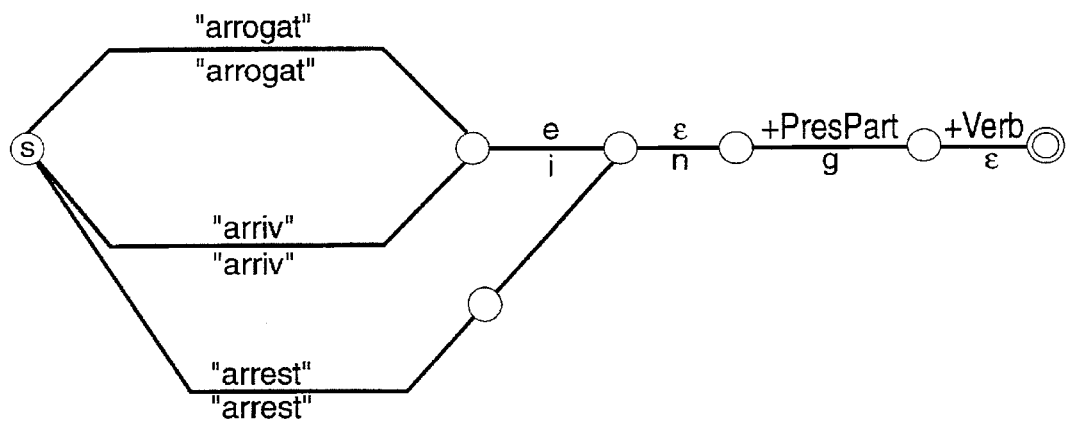

The transducer in FIG. 10 can be used in generation (look-down) mode, represented by the downward arrow, to derive the proper form "arriving" and in recognition (look-up) mode, represented by the upward arrow, to map the word "arriving" to the stem "arrive" plus the morphological properties represented by the "ing" suffix. The character-based transducer that includes morphological tags in its alphabet shown in FIG. 10 is a significantly more compact tool for morphological analysis and generation than the sort of transducer described in reference [12]. The latter uses strings rather than characters as arc labels. This vastly increases the size of the alphabet compared to our character-based transducer, and requires much more complex matching in the corresponding look-up and look-down operations. Further, our technique of using character-labeled transitions allows standard determinizing and minimizing algorithms to collapse the initial and trailing substring that several words in a language might share. This effect is illustrated in FIGS. 11A and B, which contrast for a small number of words (arriving, arresting, arrogating) the initial substring sharing that our character-based representation permits (FIG. 11A) with a corresponding string-based representation (FIG. 11B) as proposed in reference [12]. Notice how many fewer occurrences of the characters a and r there are in FIG. 11A vs. FIG. 11B. Character-based sharing can drastically reduce the size of a full-language transducer. Both types of transducers are more efficient for analysis than systems of the type described in reference [5] which in effect represent morphological information as annotations on states and not as arc labels.

Morphological analysis transducers are useful not only in performing text retrieval, but also in other types of automatic text processing applications. For example, they can be used in devices for verb conjugation and deconjugation that people might use for reference and teaching, particularly of languages that are more inflected than English. They can be used in an initial look-up step in processing the words in a source language input sentence that is to be translated by a machine into another target language, and in a final look-down step to produce the actual words in the target language from the morphological properties that result from the translation process. As another example, they can also be used in a look-up step prior to parsing natural-language sentences in database query systems.

Figure 3A:
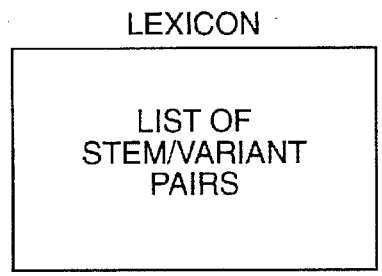
FIGS. 3A–3D are examples of lexicons representing languages.
Figure 3B:
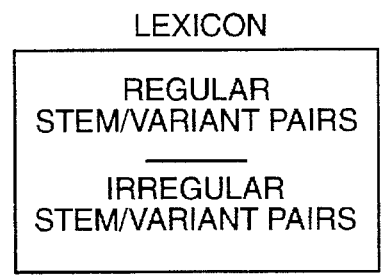
Figure 3C:
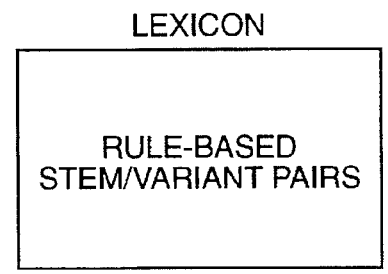
Figure 3D:
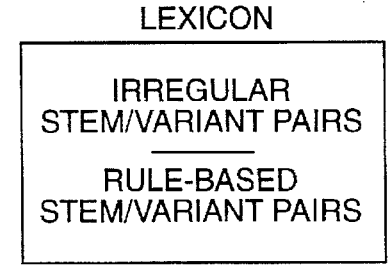

The words of any language can be defined in a number of different ways. For example, the Lexicon representative of a language can comprise:

1. If there are only a finite number of stem/variant pairs in the language, they can simply be listed. (FIG. 3A). The listing can include (FIG. 3B) regular as well as irregular stem-variant pairs. 2. Systematic inflectional and derivational alternations, such as regular word variants of stems, can be described by linguistic Rule systems or grammars, and we prefer to incorporate several classes of these rules (such as two level rules and ordered rewriting systems) into an FST compilation (FIG. 3C). 3. Combine the Rule system of item 2 with outstanding irregular forms which can simply be listed as a finite list (FIG. 3D).

Figure 4:
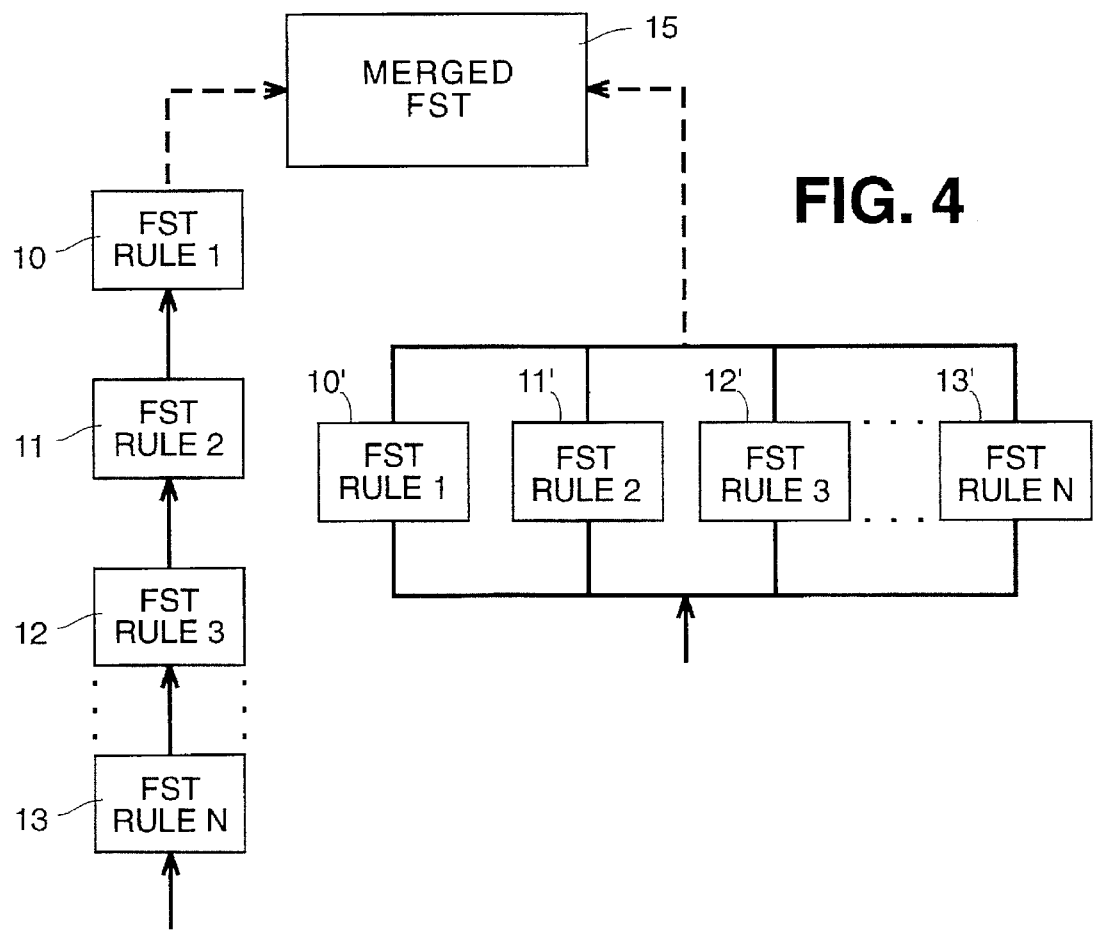
FIG. 4 illustrates combining of FSTs into a merged FST.

Then, as explained, for example, in reference [3], the resultant lexicon representing a language is built up of lists, or of Rules, or of list and Rules, with an FST created to effect the mapping of each list element or Rule. There may be hundreds of such FSTs to contend with and it is difficult to implement correctly and efficiently a system that properly interprets all of them as a group. However, they can all be merged into a single FST that has the same effect as all of them operating together, and algorithms for generating and recognizing with a single transducer are both simple and efficient. This solution is explained in reference [3] and is based on the teachings in reference [6]. The former shows how it is possible to combine a plurality of FSTs into a single FST. This is illustrated in FIG. 4.

As described in the references, individual FSTs can be combined in two principal ways. On the left side of FIG. 4 are represented a sequence of FSTs 10, 11, 12, 13, arranged in series relationship each modeling a specific Rule 1, 2, 3 . . . N of the grammar. Following the teachings in the bracketed references, these can be cascaded and combined or merged into a single FST 15 by a well-known composition algorithm for FSTs. Alternatively, as shown in the right side, the individual FSTs 10', 11', 12', 13' for Rules 1, 2, 3 . . . N can be arranged in parallel relationship and combined into a single merged FST 15 by a well-known intersection algorithm. An advantage is that the calculus of FSTs provides for merging transducers no matter how the FSTs are created. In particular, transducers corresponding to finite lists of irregular forms can be merged with FSTs corresponding to rules (the combination in FIG. 3D) in the following way. If I is a transducer derived from a finite list of irregular pairs (e.g. <hear heard>), and R is a transducer derived from regular rules (that erroneously includes <hear heared>), we can properly merge the two sources of information. A preferred way is as follows: compute the identity transducer for the complement of the domain of the relation I, precompose it with R, and then union the result with I. The result will provide the stem-variant mappings defined in R only if they are not over-ridden by the exceptions in I. In general, the final FST can be created from pieces defined by several different techniques and combined together using any of a large number of relational operations that preserve regularity.

When an FST encoding the stem/variant relations has been created, it can be used directly as the known tail-cropping algorithms are used [2], namely, to stem both query and text-words prior to matching. But it can also be used in the opposite way, as a generator that expands variant forms in a query to a disjunction of all other variants of the same stem. Thus, a query containing "arrive" would be expanded to the disjunction of possibilities {arrive, arrival, arrives, arrived, arriving}, and this set of terms could be matched against an unstemmed text. A single FST can readily be constructed that will provide exactly this capability, simply by composing a stemming transducer with its inverse. The inverse of an FST can be created by the well-known technique of simply exchanging the upper and lower symbols of each transition label. In contrast, it is extremely difficult, if not impossible, to compute the inverse of a tail-cropping algorithm.

It will be recognized from the above exposition and from perusal of the referenced publications that, for an English language database containing, for example, 56,000 stems and 218,000 variants, the resultant FST would be expected to be gigantic, requiring enormous amounts of memory to store, and requiring excessive time for even a fast processor to access. This would be a problem even for a mainframe, yet an important segment of users employs PCs with more limited CPU and memory resources. In accordance with further features of the present invention, we describe a number of techniques that make such FSTs practical for information retrieval stemming even with a modestly priced PC with limited RAM. These techniques include:

(1) Methods for compiling word-lists into (one-tape) finite-state machines (FSMs) and stem-variant pairs and rules into finite-state transducers, (2) methods for making a single FST that has the same input-output behavior as a whole collection of other FSTs, (3) a method for representing FSTs in FSM data structures, (4) a technique for encoding FSMs in a minimal space, described in detail in the referenced related application.

The incorporation of one or more of the foregoing concepts is desirable in making and compressing a single FST to a size only modestly larger than simple FSMs containing only the inflected forms or only the lexical forms but without the mapping between the two representations.

Figure 1:
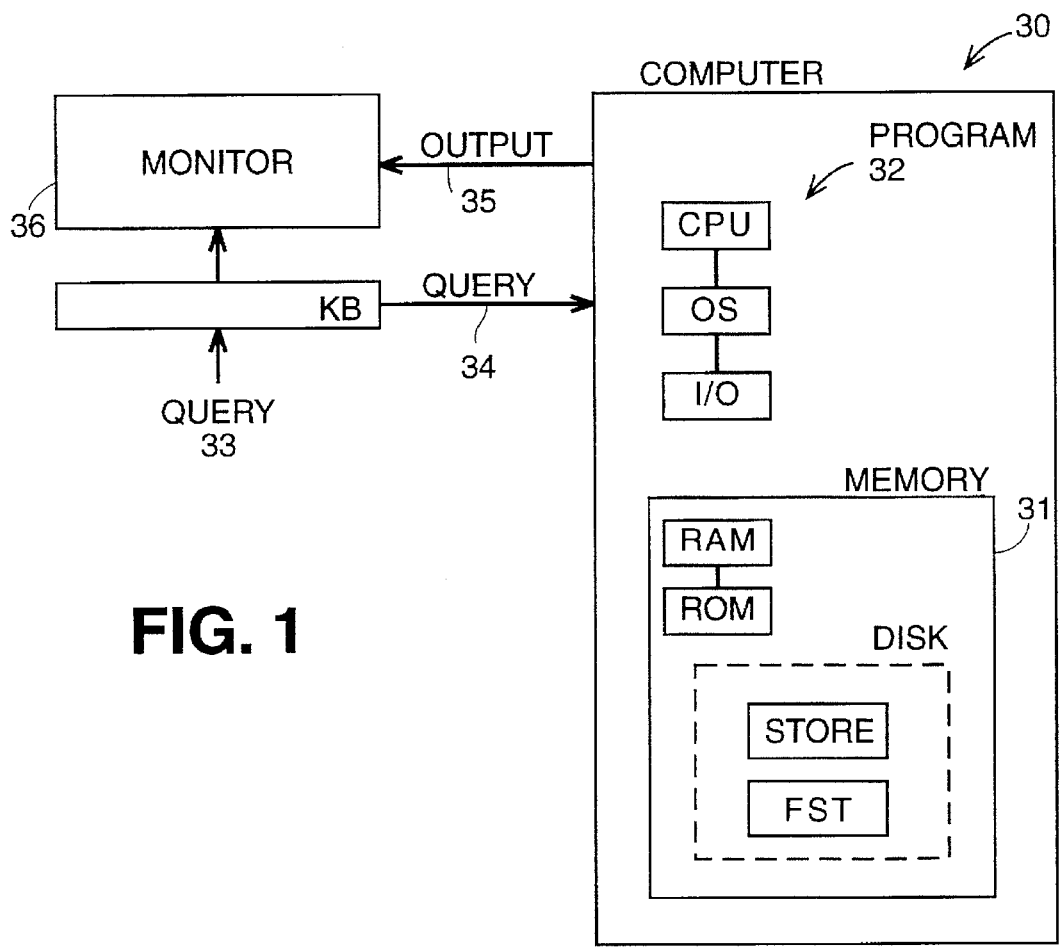
FIG. 1 is a block diagram of one form of a system incorporating the invention.
Figure 9:
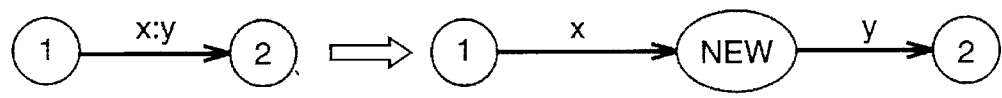
FIG. 9 illustrates how to convert an FST to an FSM.

The referenced related application, U.S. Ser. No. 06/814, 416, whose contents are hereby incorporated by reference, describes various techniques for encoding FSM data structures for more compact storage. Those techniques are based upon tying the information in the FSM data structures to the transition between states rather than to the states themselves. In a one-tape FSM the transitions are labeled with single characters, while transitions in FSTs are labeled with pairs of letters. We can convert an FST to an FSM by the very simple transformation illustrated in FIG. 9. We replace each FST transition with a pair-label of the form X:Y with a sequence of two transitions, one labeled X leaving the original state (labelled "1") of the X:Y transition and leading to a new state (labelled "NEW"), and the other labeled Y leading from that new state to the destination state (labelled "2") of the X:Y transition. The result of replacing all arcs in this way is a one-tape FSM whose odd and even transitions represent the upper and lower sides of the original FST transitions, respectively. This FSM can then be determinized and minimized with standard techniques. Thus, the FSTs of the present invention can be converted to equivalent FSMs, and the compacting techniques and algorithms described in the related case can be applied to them. This is an important benefit of the approach taken in the present invention. It will also be noted that the computing machines described in the related case are the same kind of machines that can be used to implement the present invention. There is no need to describe these machines in any great detail here, since the reader who seeks more details can access directly the incorporated, referenced, related case. Suffice to say, as illustrated in FIG. 1, the machine 30 is a straight-forward general-purpose computer, with provision for storing 31 in the usual way (RAM, ROM, DISC, OR TAPE) the encoded data structure and the program which when executed by the CPU 32 will receive user queries 33, search 34 the encoded memory for matches for user-supplied inputs, and output to the user, for example, via a monitor 36, the matched items found, or an identification of a document where they may be found, or an indication that no matches were found.

Figure 5:
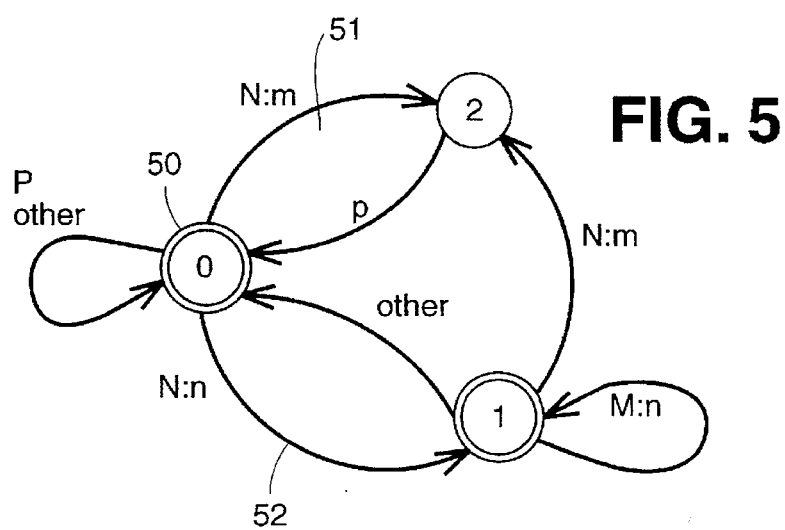
FIG. 5 illustrates a two-level rule FST.

FIG. 5 shows an example of an FST created to generate stems or lexical forms from a surface form based on a rule. The example is lifted from reference [3] (rules 5a and 5b), transducers in FIGS. 4 and 5 of the paper. A sample two-level rule in words: Lexical N is realized as surface m if and only if it is followed by a p on the lexical side (regardless of how that p itself is realized). The same two-level rule formally: N:m<=>_p: (in the notation of Koskenniemi 1983 reference [5]). This rule might be used to indicate that the words "impractical" and "intractable" are derived from the lexical forms "iNpractical" and iNtractable", respectively, which have the same lexical representation (iN) for the prefix meaning "not". The corresponding transducer shown in FIG. 5 comprises a state 50, the double circle that is both the start and a final state. If N is realized as m, the transducer moves to state 51, a nonfinal state which requires a p as the next input. If N is realized as n, the transducer moves to state 52 that does not allow a p to follow. The transducer thus encodes one additional fact that is not explicitly represented in the rule: lexical N's are realized as n in all other cases. Examples of other typical rules that would actually be used for English can be found in reference [3]. Each of the rules would have their own FST, combined as described in connection with FIG. 4 into a single rules FST.

It will also be understood that many known algorithms exist for minimizing states in finite automata, which include FSMs and FSTs. These should be used to further reduce the size of the resultant data structure. Relevant publications in this area include references [1], [8], and [10].

A set of rules in a grammar applies to all strings in the alphabet of the language, whether or not they are, or ever could be, real stems. It is desirable to restrict the rules so that they only apply to the items listed in a specific dictionary or lexicon. Since the list of words in a lexicon can be represented as a finite-state machine, this restriction can be accomplished by means of the FST composition operator. We create the identity transducer that maps every word in the lexicon into itself; this can be done, for example, by replacing the label on every transition in the FSM with a pair containing two instances of that label. We compose that identity transducer with the FST representing the rules and irregular forms (FIG. 3D). The resulting FST is now restricted to apply only to forms in the lexicon. The single merged FST is especially significant because the composition of a source lexicon with an arbitrary number of rule transducers makes it possible for a simple look-down algorithm to enumerate in a systematic way all the well-formed word forms of a language. A rule-based enumeration is more complete than any word list derived from collections of text, which is important for an application such as stemming.

Figure 6A:
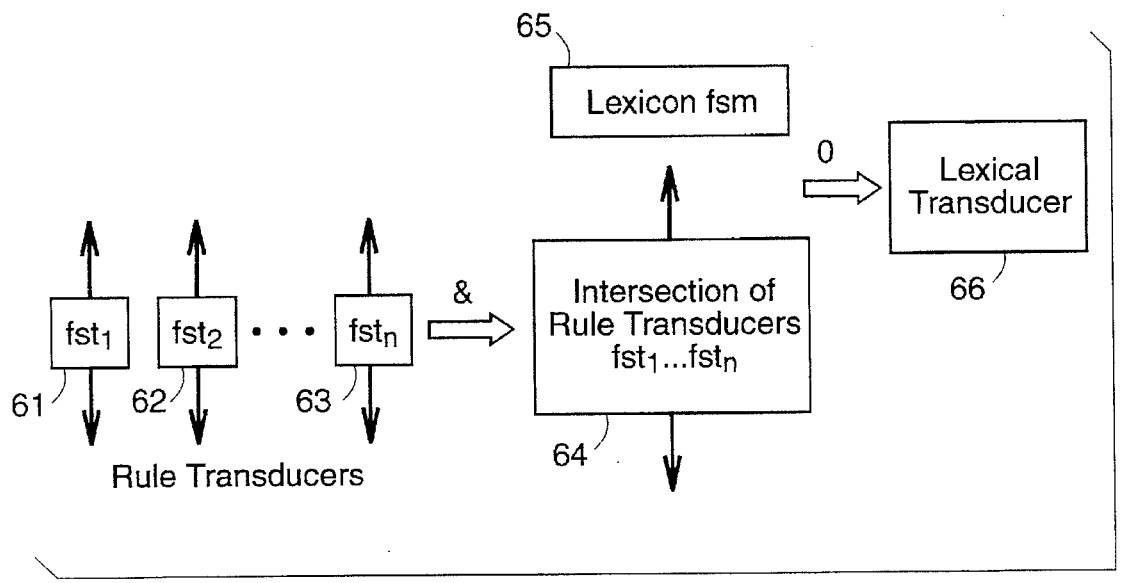
FIGS. 6A and 6B are block diagrams illustrating the construction of a merged FST in accordance with the invention.

If the lexicon is to be composed with rules that are combined by intersection, the natural order of operations would be to form the FST for the intersection of the rules, and them compose it with the lexicon identity transducer. This strategy is illustrated in FIG. 6A, which indicates that a first set of rule transducers $fst_1 \ldots fst_n$ 61, 62, 63 are intersected, as indicated by the ampersand symbol. We have observed that in practice performing this intersection can take a very large amount of time, even on a powerful workstation, and the resulting transducer is extremely large. In many cases this computation cannot run to completion because of either time or memory limitations. However, we have also observed that when it can be constructed 64 and it is then composed (indicated by the circle symbol) with the lexicon 65, the final result 66 is quite manageable in size. This is because many states and transitions in the intersection are never traversed when the FST is applied to just the specific list of words in the lexicon, and they are removed in the composition procedure.

Figure 6B:
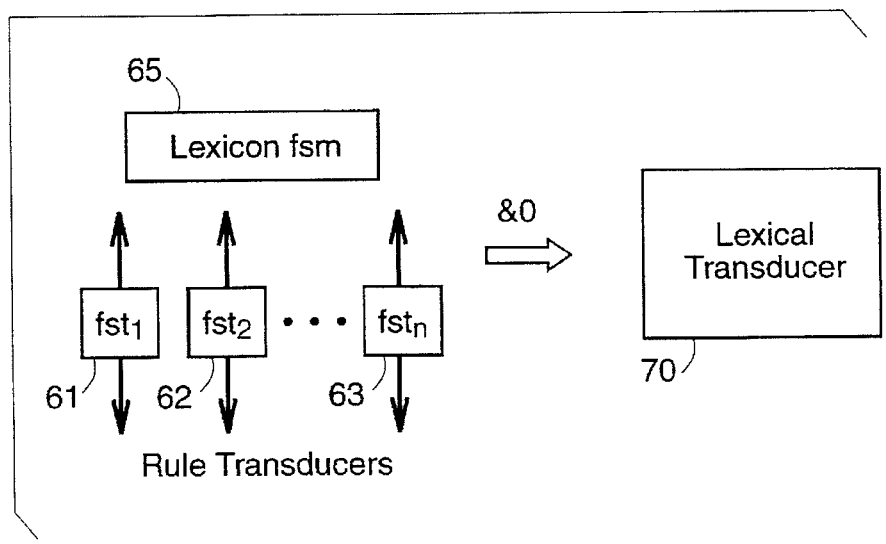

Thus, the preferred method according to our invention for creating an FST that behaves as the composition of a lexicon with the intersection of rules is illustrated in FIG. 6B. This method avoids computing an unmanageably large intermediate structure 64 while still producing a final result of tractable size. In this example, the set of rule transducers 61 ... 63 are simultaneously intersected and composed with the lexicon fsm 65, to produce the desired lexical transducer 70. The simultaneous intersection and composition avoids the large intermediate result indicated at 64 in FIG. 6A. The resultant lexical transducer 70 is the desired single merged FST 70, which is a map defined logically by the composition of the lexicon with the intersection of the rule transducers. The code in annexed Appendix A represents one way of implementing the preferred method illustrated in FIG. 6B.

It will be understood that the present invention concerns a novel technique for retrieving information using stemming. It is based on the use of FSTs. Compact FSTs are desirable because of reduced storage requirements and increased speed. While certain compacting techniques are preferred as indicated above because of their efficiency—and it is an important benefit of our present invention that such preferred compacting schemes can be used in implementing the present invention—the invention is not limited to the use of such preferred compacting schemes and virtually all compacting schemes can be incorporated without departing from the principles enunciated herein.

Figure 7B:
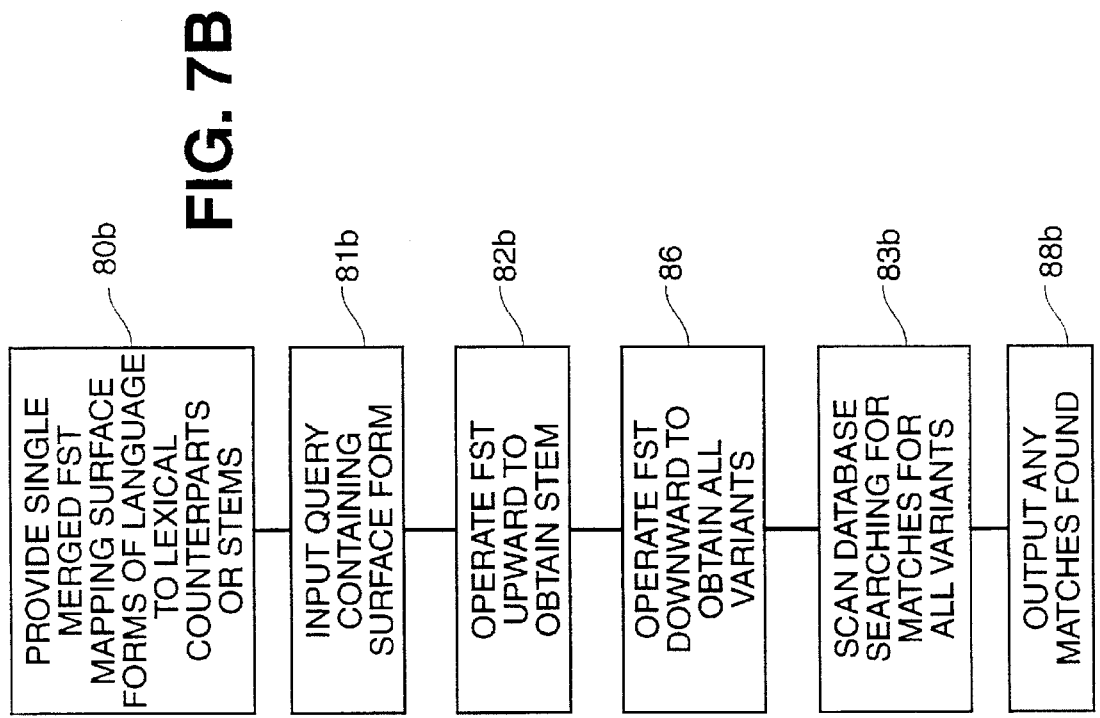
FIGS. 7A–7E illustrate algorithms describing the different modes in which the system of the invention can operate.
Figure 7A:
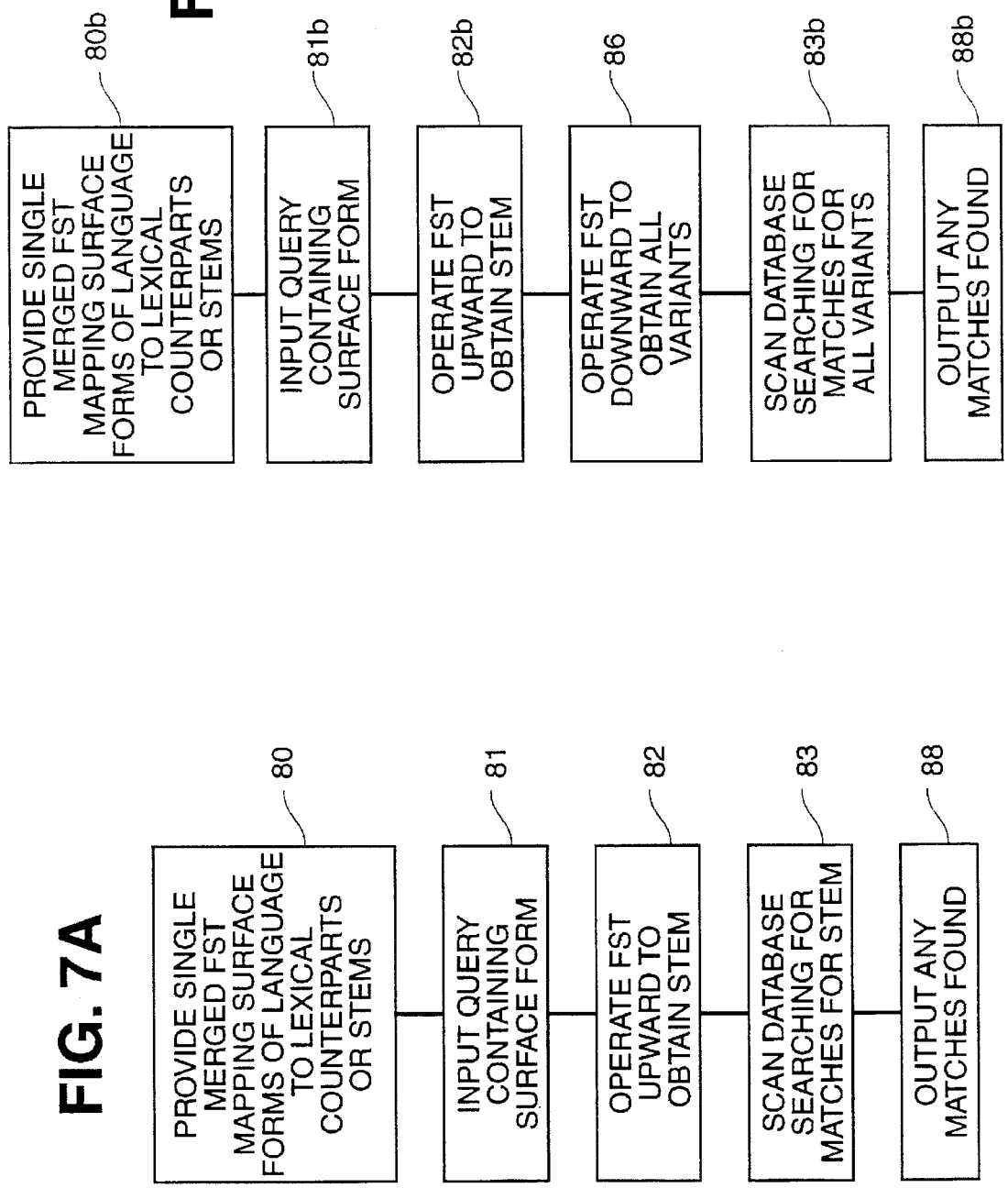
Figure 7D:
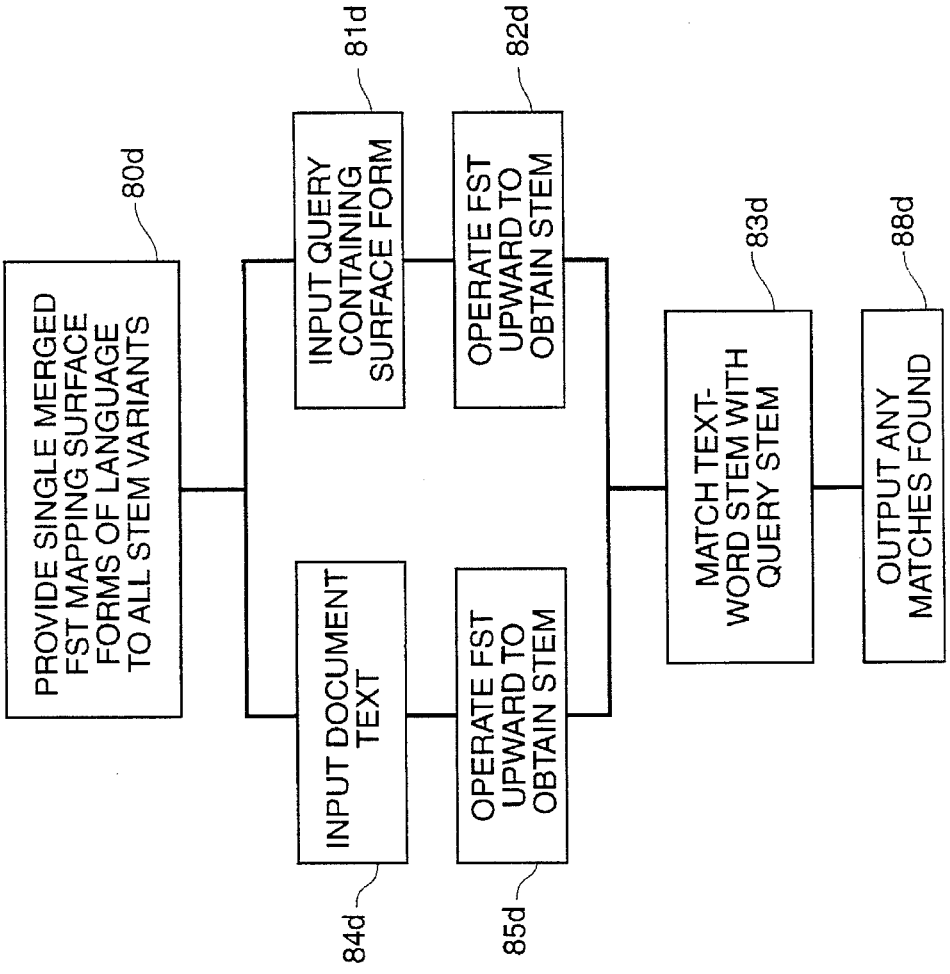
Figure 7C:
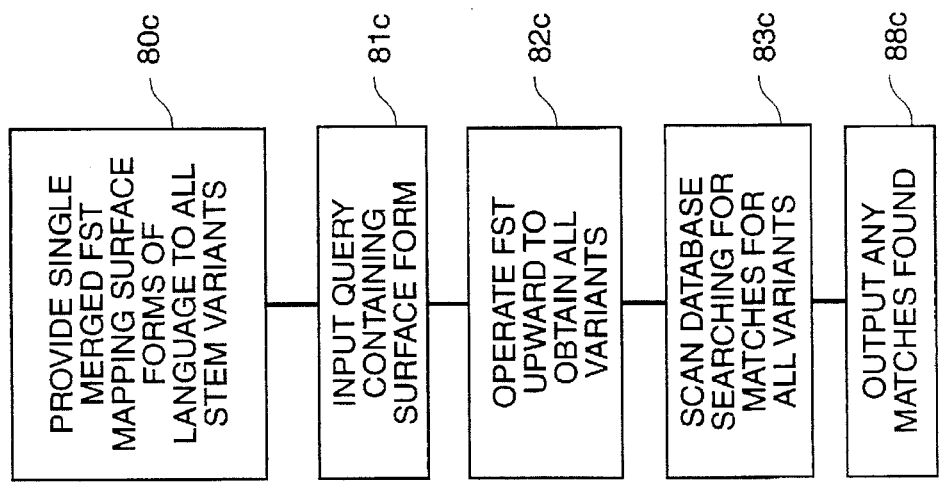

Important benefits in the information retrieval context of the invention, as will be clear from FIG. 7A, include that the resultant single merged FST 80 can operate both ways, in contrast to prior art stemmers which typically operate only one way—from the surface form to the stem. This greatly increases the flexibility of the invention and its applications to existing databases. A typical existing database would likely have a word index, with values indicating document locations for those words, but not a stem index. The invention can readily be added in one of two ways: (1) Use the merged FST to pre-stem the word index and form a new index of just stems linked to the corresponding values from the word index. FIG. 7A shows that when the surface form query word is input 81, the look-up algorithm is applied 82 to produce from the query word its stem. Then, the new stem index can be scanned 83 for a match with the query stem. The match is then output to the user 88. (2) As shown in FIG. 7B, pre-stem the query word by applying the look-up algorithm 82b, then use the FST again 86, this time using the look-down algorithm to generate all the variants of that stem. Then scan the original word index 83b looking for a match with each of the variants. (3) An alternative to this second strategy is illustrated in FIG. 7C. In this case, all stem variants are produced 82c by the look-up algorithm operating on a single FST created by composing the merged FST with its inverse. This alternative will be faster than the method in FIG. 7B, but in some cases the composed transducer may be too large to be practical. In all cases, the ability of the FST to deal systematically with stems and variants produces much improved results in identification of documents containing related words. Thus, existing databases require no special treatment to upgrade their search capabilities. And, as a further fringe benefit, the FST will do a better stemming job, and can guarantee that every stem produced is a complete English word.

Figure 7E:
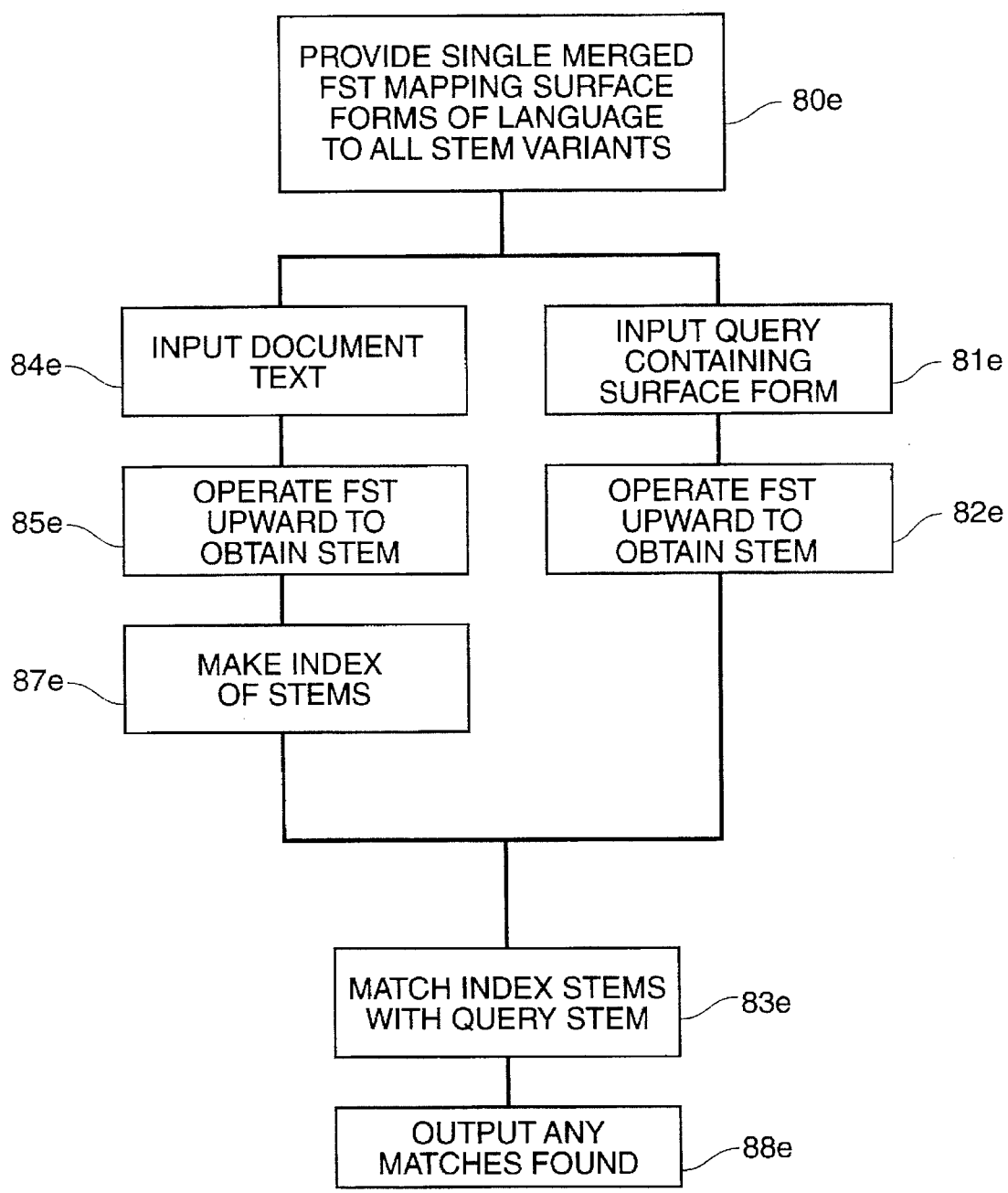

The procedures illustrated in FIGS. 7A, 7B, and C can also be applied to a document database for which no word index exists. In this situation, the database that is scanned in 83b and 83c can be the full text of the documents in the database. Thus, a query word is expanded to the set of all its variants, and these are disjunctively compared with all the words in the database to determine a match. A modified version of the procedure in FIG. 7A can also be implemented: the stem for a query word is computed once, and that is compared to the stem (computed using the look-up algorithm) of each of the words in the document database. This is illustrated in FIG. 7D. FIG. 7E illustrates how the transducer might first be applied to a database of document texts to build a stem-index whose entries can then be matched against the stems of particular query-words. Similar blocks are referenced with the same reference numeral.

There will be instances in which the FST functioning as a stemmer will be capable of producing several stems that would qualify. For example, if the surface form is "DOES", the stem could be "DO" (where "DOES" is treated as a verb), or the stem could be "DOE" (where "DOES" is treated as plural deer). Various rules can be applied to resolve this situation. One simple solution is to produce both of the stems, and process each as if it were the only stem, at worst increasing the number of documents identified. One rule we can follow is to always chose the shortest stem. In the above example, we would chose "DO", which would include among its inflected forms "DOE" and "DOES". However, if the transducer is configured to operate as a morphological analyzer and produces affix and part-of-speech tags as well as stems, then one of several known techniques for resolving part-of-speech ambiguities (see reference [13]) can be used to select the appropriate stem in any particular syntactic context.

Using the FST of the invention is by operating the system of FIG. 1. During execution, the FST is processed or traversed for stemming or generating as described.

Those skilled in the art will have no difficulty implementing the invention in the light of the teachings herein. Nevertheless, for completeness sake, annexed hereto in Section A of the SOURCE CODE APPENDIX is an example of CommonLisp code to create a single merged stemming FST 70 using the combined intersection/ composition method in accordance with the invention based on inputs of rules, and Section B of the Source Code APPENDIX contains is an example of CommonLisp code that implements the look-up and look-down algorithms used in the procedures illustrated in FIG. 7.

Another benefit of the invention of our transducer technology in text indexing and retrieval is as follows: The words in the text of a document to be indexed not only come in different inflectional forms, they also appear in different punctuation contexts, in upper and lower case, adjacent to spaces, commas, periods, etc., or, in compounding languages like German and Finnish, immediately adjacent to the alphabetic characters of other words. A finite state transducer can be constructed that normalizes the text by inserting special markers around the characters that make up individual words to be indexed, converting to all lowercase, and simply deleting all other extraneous punctuation marks. The result of composing a normalizing transducer with a stemming transducer is a single transducer that maps the stream of punctuated characters in text into a corresponding sequence of stems.

Figure 8A:
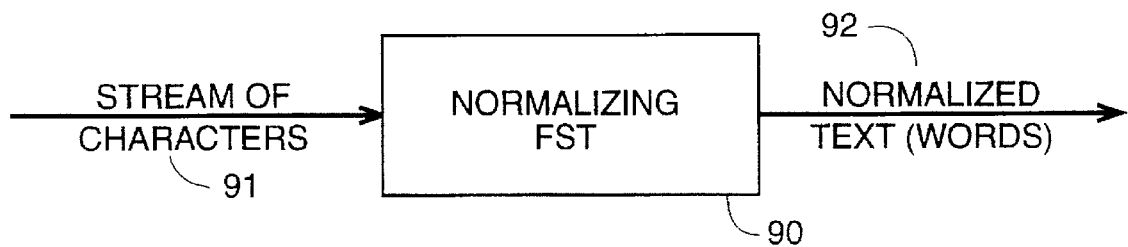
FIGS. 8A and 8B illustrate, respectively, the use of a normalizing FST and a merged FST in the treatment of a character stream in accordance with the invention.

Section C of the Source Code Appendix contains is a two-level rule system from which a normalizing FST transducer 90 (FIG. 8A) for English can be derived by means of the two-level rule compiler described in reference [6]. The input 91 would be a stream of characters from the document text. The output 92 would be normalized lowercase text containing only the individual words to be indexed.

Figure 8B:
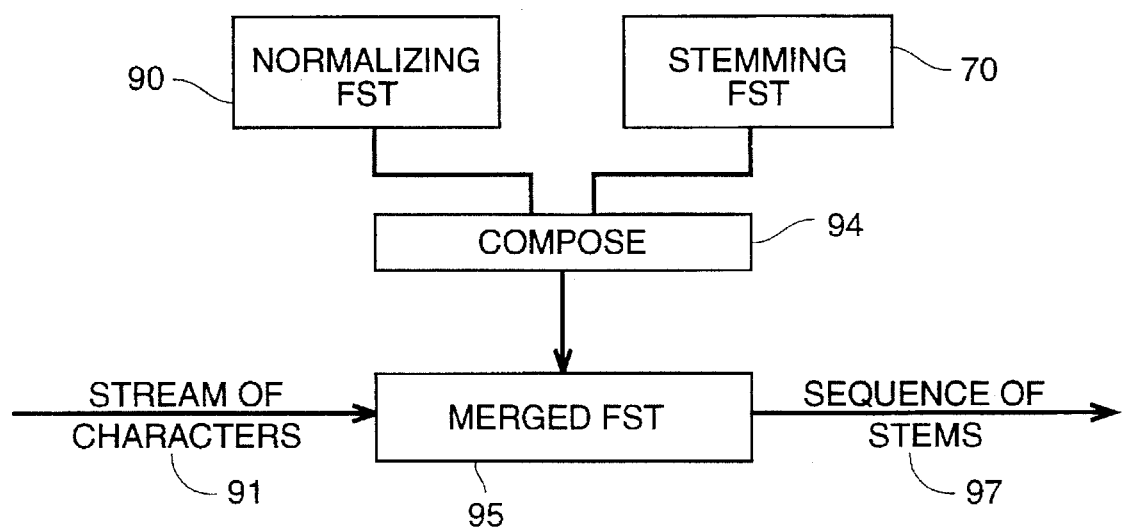

FIG. 8B illustrates a further feature of the invention, which is how to compose 94 the normalizing FST 90 with the stemming FST 70 of FIG. 6B. The result is a new merged FST 95. Now, with the new merged FST 95, inputting a stream of characters representing document text would result in their mapping into a corresponding sequence of stems 97 in a one-step operation.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

LIST OF REFERENCES

[1] "Introduction to Automata Theory, Languages and Computations", by Hopcraft and Ullman, published by Addison-Wesley in 1979, particularly pages 64–76.

[2] "Development of a Stemming Algorithm", J. B. Lovins, Mechanical Translation And Computational Linguistics, 11, pages 22–31, Mar. 1968.

[3] "Finite-state Constraints" by Lauri Karttunen, International Conference on Current Issues in Computational Linguistics. Jun. 10–14, 1991. Universiti Sains Malaysia, Penang, Malaysia. To appear in *The Last Phonological Rule:* Reflections on Constraints and Derivations, ed. by John Goldsmith, University of Chicago Press.

[4] Kaplan, R. M. and M. Kay. Phonological rules and finite-state transducers [Abstract]. *Linguistic Society of American Meeting Handbook.* Fifty-sixth Annual Meeting, Dec. 27–30, 1981. New York.

[5] Koskenniemi, K. *Two-level Morphology. A General Computational Model for Word-Form Recognition and Production.* Department of General Linguistics. University of Helsinki. 1983.

[6] Karttunen, L., K. Koskenmemi, and R. M. Kaplan. A Compiler for Two-level Phonological Rules. In Dalrymple, M. et al. *Tools for Morphological Analysis.* Center for the Study of Language and Information. Stanford University. Palo Alto. 1987.

[7] Kay, Meatin. Nonconcatenative Finite State Morphology. Proceedings of the 3rd Conference of the European Chapter of the Association for Computational Linguistics. Copenhagen 1987.

[8] Ashdown "Minimizing Finite State Machines", Embedded Systems Programming. Premier 1988, pages 57–66.

[9] "An Algorithm For Suffix Shipping", M. F. Porter; Prog. 14, No.3, pages 130–137, July 1980.

[10] "The Theory of Machinery Computation", K. Kohavi, Ed., pages 189–196, Academic Press, NY 1971.

[11] Aho and Ullman "Principles of Compiler Design", Addison-Wesley, 1977, pages 99–103, 114–117.

[12] Tzoukermann, E. and M. Y. Libennan. M. A Finite-State Mophological Processor for Spanish. *Proceedings of the 13th International Conference on Computational Linguistics.* Vol. 3. 277–282. University of Helsinki. Helsinki. 1990.

[13] Cutting, D., J. Kupiec, J. Pedersen, P. Sibun. A Practical Peat-of-Speech Tagger. *Proceedings of the Third Conference on Applied Natural Language Processing.* Trento, Italy, April 1992.

Source Code Appendix  Emacs buffer Page 1
Section A

```lisp
;;; BASIC Data Type Declarations (defconstant *epsilon-symbol*
  :epsilon)

(defconstant *other-symbol*
  :other)

(defvar *fstpair-separator* #\:)

;;; Flag fields for data packing in DEFSTRUCTS (defmacro flag-get (offset place)
  `(/= 0 (logand ,place ,(ash 1 offset))))

(defmacro setf-flag-get (offset place new-value)
  `(progn
     (setf ,place
           (if ,new-value
               (logior ,place ,(ash 1 offset))
               (logand ,place ,(lognot (ash 1 offset)))))
     ,new-value))

;;; ARC object (defstruct (arc
            (:constructor %make-arc (label next-arc))
            (:print-function print-arc)
            (:copier %copy-arc))

;; flags
  (bit-fields 2 :type (unsigned-byte 16))
  (label nil)
  (target nil)
  (next-arc nil))

;; Data Packing (defmacro arc-visited (arc)
  `(flag-get 0 (arc-bit-fields ,arc)))

(defsetf arc-visited (arc) (new-value)
  `(setf-flag-get 0 (arc-bit-fields ,arc) ,new-value))

(defmacro arc-single-origin (arc)
  `(flag-get 1 (arc-bit-fields ,arc)))

(defsetf arc-single-origin (arc) (new-value)
  `(setf-flag-get 1 (arc-bit-fields ,arc) ,new-value))

(defmacro arc-destination (arc)
  `(let ((target (arc-target ,arc)))
     (if (consp target)
         (car target)
         target)))
```

Source Code Appendix  
Section A

Emacs buffer Page 2

```lisp
(defmacro setf-arc-destination (arc new-value)
  `(let ((arc ,arc)
         (new-value ,new-value))
     (let ((target (arc-target arc)))
       (if (consp target)
           (setf (car target) new-value)
           (setf (arc-target arc) new-value)))))

(defsetf arc-destination setf-arc-destination)

(defun arc-user-pointer (arc)
  (let ((target (arc-target arc)))
    (if (consp target)
        (cdr target)
        nil)))

(defun setf-arc-user-pointer (arc new-value)
  (let ((target (arc-target arc)))
    (if (consp target)
        (if new-value
            (setf (cdr target) new-value)
            (progn (setf (arc-target arc) (car target)) nil))
        (if new-value
            (cdr (setf (arc-target arc) (cons target new-value)))))))

(defsetf arc-user-pointer setf-arc-user-pointer)

(defun make-arc
    (&key label destination next-arc visited user-pointer (single-origin t))
  (let ((arc (make-arc-boa label destination next-arc)))
    (when user-pointer
      (setf (arc-user-pointer arc) user-pointer))
    (unless single-origin
      (setf (arc-single-origin arc) nil))
    (when visited
      (setf (arc-visited arc) visited))
    arc))

(defun make-arc-boa (&optional label destination next-arc)
  (let ((arc (%make-arc label next-arc)))
    (when destination
      (setf (arc-destination arc) destination))
    arc))

(defconstant *arc-flag-names* '(single-origin visited user-flag))

(defun arc-flags (arc)
  `(,@(if (arc-visited arc)
          '(:visited))))

(defun copy-arc (arc &optional dont-change-single-origin-p)
  ;; %COPY-ARC cannot be used here because it does not make a new
  ;; CONS cell when TARGET is a DESTINATION ARC-USER-POINTER pair
  (let ((new-arc (make-arc :label (arc-label arc)
                           :destination (arc-destination arc)
                           :user-pointer (arc-user-pointer arc)
```

Source Code Appendix  Emacs buffer Page 3
Section A

```
                       :next-arc nil)))
    (setf (arc-single-origin new-arc)
          (if dont-change-single-origin-p
              (arc-single-origin arc)
              t))
    new-arc))

(defmacro do-arcs ((arc state &optional (value nil))
                   &body body)
  `(do-arc-set (,arc (state-arc-set ,state) ,value) ,@body))

(defmacro do-arc-set ((arc arc-set &optional (value nil))
                      &body body)
  `(let ((,next-arc ,arc-set)
         ,arc)
     (loop
        (when (null ,next-arc)
          (return ,value))
        (setq ,arc ,next-arc)
        (setq ,next-arc (arc-next-arc ,arc))
        ,@body)))

(defmacro doarcs (&rest args)  ; for backward compatibility
  `(do-arc-set ,@args))

(defmacro copy-arcs (arc-set)
  `(do ((old-arc ,arc-set (arc-next-arc old-arc))
        (prev-arc nil new-arc)
        (first-arc nil)
        new-arc)
       ((null old-arc) first-arc)
     (setq new-arc (copy-arc old-arc))
     (if prev-arc
         (setf (arc-next-arc prev-arc) new-arc)
         (setq first-arc new-arc))))

(defmacro push-arc (arc state)
  `(let ((,arc ,arc)
         (,state ,state))
     (setf (arc-next-arc ,arc)
           (state-arc-set ,state))
     (setf (state-arc-set ,state)
           ,arc)))

;;; STATE object (defvar *last-state-id* 0)
(proclaim '(type (unsigned-byte 18) *last-state-id*))

(defstruct (state
             (:constructor %make-state (name arc-set))
             (:print-function print-state)
             (:copier %copy-state))
  ;; Different patterns used to note different visitations
  (name nil)
```

Source Code Appendix  
Section A

Emacs buffer Page 4

```
   (arc-set nil :type (or arc null))
   ;; End   flags
   (bit-fields 0 :type (unsigned-byte 28)))

;; Data Packing (defmacro state-visit-mark (state)
   `(ldb (byte 8 0) (state-bit-fields ,state)))

(defmacro state-final (state)
   `(flag-get 8 (state-bit-fields ,state)))

(defsetf state-final (state) (new-value)
   `(setf-flag-get 8 (state-bit-fields ,state) ,new-value))

(defmacro state-deterministic (state)
   `(flag-get 9 (state-bit-fields ,state)))

(defsetf state-deterministic (state) (new-value)
   `(setf-flag-get 9 (state-bit-fields ,state) ,new-value))

(defun make-state (&key name arc-set (visit-mark 0) final deterministic)
   (make-state-boa final deterministic arc-set name visit-mark))

(defun make-state-boa
       (&optional final deterministic arc-set name (visit-mark 0))
   (declare (type (unsigned-byte 8) visit-mark))
   (let ((state (%make-state name arc-set)))
      (unless (= visit-mark 0) (setf (state-visit-mark state) visit-mark))
      (setf (state-final state) final)
      (setf (state-deterministic state) deterministic)
      (setf (state-bit-fields state)
            (dpb *last-state-id* (byte 6 10) (state-bit-fields state)))
      (setq *last-state-id*
            (if (= *last-state-id* #.(1- (expt 2 18))) 0 (1+ *last-state-id*)))
      state))

(defconstant *state-flag-names* '(final deterministic))

(defun state-flags (state)
   `(,@(if (state-final state)
           '(:final))
     ,@(if (state-deterministic state)
           '(:deterministic))))

(defun copy-state (state &optional (dont-copy-arcs-p nil))
   ;; Be careful copying the arc-set
   (let ((new-state (%copy-state state)))
      (setf (state-arc-set new-state)
            (unless dont-copy-arcs-p
              (copy-arcs (state-arc-set state))))
      new-state))

;;; NETWORK object (defstruct (network (:print-function print-network))
```

Source Code Appendix  
Section A

Emacs buffer Page 5

```lisp
;; Flags
(deterministic nil :type (member t nil))
(pruned nil :type (member t nil))
(completed nil :type (member t nil))
(minimized nil :type (member t nil))
(epsilon-free nil :type (member t nil))
(sorted-states nil :type (member t nil))
(loop-free nil :type (member t nil))
;; T if VISITMARKS are not know to be zero
(visit-marks-dirty nil :type (member t nil))
;; T means functions that use the namefield should try to restore it
(names-matter nil :type (member t nil))
;; T means that renaming is needed before printing
(names-smashed nil :type (member t nil))
;; T means that userpointer fields matter for arc equivalence,
(has-arc-user-pointer nil :type (member t nil))
;; T if sigma is closed--OTHER not present and
;; not to be inserted by COMPLETEFSM
(closed-sigma nil :type (member t nil))
;; End flags
(start-state nil)
(sigma nil :type list)
(states nil :type list)
(networkprops nil :type list))

(defconstant *network-flag-names*
  '(:deterministic :pruned :completed :minimized :epsilon-free
    :sorted-states :loop-free :visit-marks-dirty :names-matter
    :names-smashed :has-arc-user-pointer :closed-sigma))

(defun network-flags (network)
  `(,@(if (network-deterministic network)
         '(:deterministic))
    ,@(if (network-pruned network)
         '(:pruned))
    ,@(if (network-completed network)
         '(:completed))
    ,@(if (network-minimized network)
         '(:minimized))
    ,@(if (network-epsilon-free network)
         '(:epsilon-free))
    ,@(if (network-sorted-states network)
         '(:sorted-states))
    ,@(if (network-loop-free network)
         '(:loop-free))
    ,@(if (network-visit-marks-dirty network)
         '(:visit-marks-dirty))
    ,@(if (network-names-matter network)
         '(:names-matter))
    ,@(if (network-names-smashed network)
         '(:names-smashed))
    ,@(if (network-has-arc-user-pointer network)
         '(:has-arc-user-pointer))
    ,@(if (network-closed-sigma network)
         '(:closed-sigma))))
```

Source Code Appendix  
Section A

Emacs buffer Page 6

```
(defun set-network-flags (network flags)
   (dolist (flag flags)
      (case flag
            (:deterministic (setf (network-deterministic network) t))
            (:pruned (setf (network-pruned network) t))
            (:completed (setf (network-completed network) t))
            (:minimized (setf (network-minimized network) t))
            (:epsilon-free (setf (network-epsilon-free network) t))
            (:sorted-states (setf (network-sorted-states network) t))
            (:loop-free (setf (network-loop-free network) t))
            (:visit-marks-dirty (setf (network-visit-marks-dirty network) t))
            (:names-matter (setf (network-names-matter network) t))
            (:names-smashed (setf (network-names-smashed network) t))
            (:has-arc-user-pointer
               (setf (network-has-arc-user-pointer network) t))
            (:closed-sigma (setf (network-closed-sigma network) t))
            (otherwise (error "Unrecognized network-flag: ~s" flag))))
   flags)

(defsetf network-flags (network) (flags)
   `(set-network-flags ,network ,flags))

(defmacro networkprop (network prop)
   `(getf (network-networkprops ,network)
          ,prop))

(defmacro set-networkprop (network prop nv)
   `(setf (networkprop ,network ,prop) ,nv))

(defmacro network-name (network)
   `(networkprop ,network #+xerox 'il:networkname #-xerox :network-name))

(defmacro make-fsm (&key network-props startstate-props)
   ;; MAKE-FSM is a more convenient form of MAKE-NETWORK. Example:
   ;; (MAKE-FSM :NETWORK-PROPS (DETERMINISTIC MINIMIZED)
   ;;;          :STARTSTATE-PROPS (DETSTATE))
   (let ((keyword-package (find-package "KEYWORD")))
      `(let ((start (make-state
                      :name 0
                      ,@(mapcan #'(lambda (prop)
                                     (list (intern (string prop)
                                                    keyword-package)
                                           t))
                                startstate-props))))
         (make-network
            :start-state start :states (list start)
            ,@(mapcan #'(lambda (prop)
                           (list (intern (string prop)
                                          keyword-package)
                                 t))
                      network-props)))))

;;; fstpair object (defstruct (fstpair (:print-function print-fstpair)
```

Source Code Appendix  
Section A

Emacs buffer Page 7

```lisp
                        (:constructor make-fstpair))
  (upper nil :type symbol)
  (lower nil :type symbol))

(defun fstlab (upper lower)
  (if (and (eq upper lower)
           (not (eq upper *other-symbol*)))
      upper
      (make-fstpair :upper upper :lower lower)))

(defstruct configuration final states delta)

;;; Auxiliary routines (defun get-configuration (config transition)
  ;; Configuration is analogous to a state in a simple network
  ;; It consists of a state vector, a finality flag and a place (delta)
  ;; to store the next configuration that can be reached by
  ;; traversing over a transition. Delta is an association list,
  ;; intially NIL, of (TRANSITION DESTINATION-CONFIGURATION) pairs,
  ;; analogous to the arc-set of a simple state.
  ;;
  ;; GET-CONFIGURATION returns a new configuration if every state in the
  ;; configuration has that transition, otherwise nil. If the function
  ;; has been previously called with the same pair of arguments, the
  ;; value is obtained from DELTA, otherwise we compute it now.
  ;;
  ;; If *trace-p* is t, returns two values on failure
  ;; the first value is nil the second is the list of
  ;; positions in the last configuration that have no
  ;; transition
  (let ((cell (assoc transition (configuration-delta config)
                     :test #'eq)))
    (if (or (null cell)
            (and (null (cdr cell))
                 *trace-p*))
        (let ((states (configuration-states config))
              (branch nil)
              (last-branch *config-tree*))
          (do ((n 0 (1+ n))
               (scratch-tail *scratch-config* (cdr scratch-tail))
               (failures ()))
              ((= n *config-size*)
               (if (null failures)
                   (let ((next-config (cdr last-branch)))
                     (unless next-config
                       (incf *number-of-configs*)
                       (setq next-config
                             (make-new-configuration *scratch-config*))
                       (rplacd last-branch next-config))
                     (setf (configuration-delta config)
                           (push (cons transition next-config)
                                 (configuration-delta config)))
                     next-config)
```

Source Code Appendix  
Section A

Emacs buffer Page 8

```
                    (values nil
                            (reverse failures)))))
              (let ((dest-state (svref (state-arc-set (svref states n))
                                       transition)))
                (if dest-state
                    (rplaca scratch-tail dest-state)
                  (if *trace-p*
                      (push n failures)
                    (progn
                      (setf (configuration-delta config)
                            (push (cons transition nil)
                                  (configuration-delta config)))
                      (return nil))))
                (unless (setq branch (assoc dest-state (cdr last-branch)))
                  (setq branch (list dest-state))
                  (push branch (cdr last-branch)))
                (setq last-branch branch))))
        (cdr cell)))))

------------------------------------------------------------------------

;;;; COMPOSE-INTERSECT

;;; Does simultaneous composition of a single lexicon (either a
;;; simple network or a transducer) with the intersection of a set
;;; of transducers.  The result is a transducer that maps the upper
;;; side of the lexicon to the lower side of the transducer.

(defun compose-intersect (upper-net lower-nets &key (dont-minimize-p nil)
                                                    (zero-to-epsilon-p t)
                                                    (add-boundaries-p t)
                                                    (dots-p nil)
                                                    (quiet-p nil)
                                                    (word-boundary
                                                     (intern "#" *fsm-user-package*))
                                                    (lower-fsm-p nil))
  ;; Composes UPPER-NET with LOWER-NETS.  UPPER-NET may be a simple network
  ;; or a transducer.  LOWER-NETS are expected to be transducers.
  ;; If LOWER-FSM-P is non-NIL, the resulting network is just the lower
  ;; half of the transducer that otherwise would be computed.

(let* ((epsilon-symbol (if zero-to-epsilon-p
                             *epsilon-symbol*
                             0))
         (epenthesis-label (make-fstpair :upper epsilon-symbol
                                         :lower :other))
         (upper-labels (fsm::make-arc-labels-eq upper-net))
         (epenthesis-label-no (length upper-labels))
         (middle-match
          (let ((array (make-array (1+ (length upper-labels)))))
            (dotimes (n (1- (length array)))
              (let ((lower-symbol (lower-symbol (aref upper-labels n))))
```

Source Code Appendix  
Section A

```
         (if (eq lower-symbol epsilon-symbol)
             ;; If the lower symbol is an epsilon symbol, it won't
             ;; be matched it against anything.
             (setf (svref array n)
                   (svref upper-labels n))
             (setf (svref array n)
                   (surface-counterparts
                    (lower-symbol (svref upper-labels n)))))))))
      (setf (aref array epenthesis-label-no)
            (surface-counterparts (fstpair-upper epenthesis-label)))
      array))
   (epenthesis-p (consp (aref middle-match
                              (1- (length middle-match)))))
   (composite-labels
    (let ((array (make-array (length middle-match))))
      (dotimes (n (1- (length array)))
        (let* ((upper-label (svref upper-labels n))
               (u-upper (upper-symbol upper-label))
               (u-lower (lower-symbol upper-label)))
          (setf (svref array n)
                (pt::with-collection
                 (dolist (m (surface-counterparts u-lower))
                   (pt::collect
                    (let* ((lower-label (svref *pair-alphabet* m))
                           (l-lower (lower-symbol lower-label)))
                      (if (eq u-upper l-lower)
                          u-upper
                          (if lower-fsm-p
                              l-lower
                              (make-fstpair :upper u-upper
                                            :lower l-lower)))))))))))
      (setf (svref array epenthesis-label-no)
            (pt::with-collection
             (dolist (m (svref middle-match epenthesis-label-no))
               (pt::collect
                (let ((upper (fstpair-upper epenthesis-label))
                      (lower (lower-symbol (svref *pair-alphabet* m))))
                  (if (eq upper lower)
                      upper
                      (make-fstpair :upper upper
                                    :lower lower)))))))
      array))
   (composite-fst (make-fsm))
   (pairs-to-do nil)
   (same-dest-count 0)
   (begin-time (get-internal-real-time))
   (boundary-label (make-fstpair :upper word-boundary
                                 :lower (if zero-to-epsilon-p
                                            *epsilon-symbol*
                                            0)))
   (boundary-label-no (position boundary-label
                                *pair-alphabet* :test #'label=))

(init-config *init-config*)
   (*print-case* :upcase)
```

Source Code Appendix
Section A                    Emacs buffer Page 1

```
       (deterministic-p nil)))
  (labels ((process-upper-arc
             (label destination user-pointer composite-state)
             (let ((match (svref middle-match label))
                   (configuration (state-name composite-state)))
               (if (consp match)
                   ;; lower-side of the arc-label is not the epsilon symbol
                   (do ((matches match (cdr matches))
                        (labels (svref composite-labels label) (cdr labels)))
                       ((null matches))
                     (let ((new-config
                            (get-configuration configuration
                                               (car matches))))
                       (when new-config
                         (build-arc (car labels) composite-state
                                    new-config destination user-pointer
                                    epenthesis-p))))
                   ;; lower side the arc label is the epsilon symbol
                   ;; keep the same configuration, no epenthesis at
                   ;; the destination
                   (build-arc match composite-state configuration
                              destination user-pointer
                              nil))))
           (build-arc
             (label composite-state configuration upper-destination
                    user-pointer try-epenthesis-p)
             (let ((composite-destination
                    (dolist (state (state-name upper-destination)
                                   nil)
                      (when (eq (state-name state)
                                configuration)
                        (incf same-dest-count)
                        (setq try-epenthesis-p nil)
                        (return state)))))
               (unless composite-destination
                 (setq composite-destination
                       (make-state :name configuration
                                   :deterministic (and deterministic-p
                                                       (not try-epenthesis-p))
                                   :final (final-state-p
                                           upper-destination
                                           configuration)))
                 (push composite-destination (network-states composite-fst))
                 (push composite-destination (state-name upper-destination))
                 (push (cons upper-destination composite-destination)
                       pairs-to-do))
               (add-arc composite-state label composite-destination
                        user-pointer)
               (when try-epenthesis-p
                 (process-upper-arc epenthesis-label-no upper-destination
                                    nil composite-destination))))
           (final-state-p
             (state configuration)
             (and (state-final state)
                  (configuration-final configuration)))
           (find-final-arc-p
```

Source Code Appendix
Section A

Emacs buffer Page 1

```
         (configuration)
         (let ((config
                 (get-configuration configuration boundary-label-no)))
            (and config
                 (configuration-final config)))))
  (let* ((boundary-arc-p (and add-boundaries-p
                              (numberp boundary-label-no)))
         (upper-start-state (network-start-state upper-net))
         (composite-start-state (network-start-state composite-fst)))

;; The result is guaranteed to be deterministic only if
    ;; (1) UPPER-NET is a deterministic simple network (not a transducer),
    ;; (2) all the transducers in LOWER-NETS are deterministic
    ;; (3) the result is a transducer, not a simple surface fsm
    (setq deterministic-p
          (and (network-deterministic upper-net)
               (dotimes (n (length upper-labels) t)
                 (when (fstpair-p (aref upper-labels n))
                   (return nil)))
               (every #'network-deterministic lower-nets)
               (not lower-fsm-p)))
    (setf (network-deterministic composite-fst) deterministic-p)
    (set-networkprop composite-fst :network-name
                     (networkprop upper-net :network-name))

(unless quiet-p
      (if epenthesis-p
          (format *terminal-io* "~&Epenthetical forms are possible~%")
          (format *terminal-io* "~&No epenthesis~%")))
    (if boundary-arc-p
        (progn
          (unless quiet-p
            (format *terminal-io*
                    "~&Initial and final word boundaries added~%"))
          (setq init-config
                (get-configuration init-config boundary-label-no)))
        (progn
          (unless quiet-p
            (format *terminal-io*
                    "~&No surrouding  word boundaries added~%"))))
    (prepare-state-names upper-net)
    (setf (state-deterministic composite-start-state)
          deterministic-p)
    (setf (state-name composite-start-state)
          init-config)
    (setf (state-final composite-start-state)
          (final-state-p upper-start-state init-config))
    (push composite-start-state (state-name upper-start-state))
    (when epenthesis-p
      (process-upper-arc epenthesis-label-no upper-start-state
                         nil composite-start-state))
    (do ((task (cons upper-start-state composite-start-state)
               (pop pairs-to-do)))
        ((null task))
      (let ((upper-state (car task))
            (lower-state (cdr task)))
        (when (state-final upper-state)
```

Source Code Appendix  
Section A

Emacs buffer Page 1

```
; Simulate transition over a boundary arc
   (if boundary-arc-p
       (setf (state-final lower-state)
             (find-final-arc-p (state-name lower-state))))
   (when (and dots-p
              (not quiet-p)
              (state-final lower-state))
       (princ "." *terminal-io*)
       (force-output *terminal-io*)))
   (doarcs (arc (state-arc-set upper-state))
       (process-upper-arc (arc-label arc) (arc-destination arc)
                          (arc-user-pointer arc) lower-state))))
(prepare-state-names upper-net)
(dolist (network lower-nets)
    (prepare-state-names network))
(fsm::unmake-arc-labels-eq upper-net upper-labels)
(unless quiet-p
    (format *terminal-io* "~&Done, ~a~%" (timing-string begin-time))
    (format *terminal-io* "~&~d automata configurations~%"
            *number-of-configs*)
    (format *terminal-io* "~&~d arcs share destinations~%"
            same-dest-count)
    (print-fsm-size composite-fst *terminal-io*))
(if dont-minimize-p
    (prepare-state-names composite-fst)
    (progn
      (unless quiet-p
        (format t "~&Minimizing...")
        (setq begin-time (get-internal-real-time)))
      (min-fsm composite-fst)
      (prune-one-sided-epsilons composite-fst)
      (unless quiet-p
        (format *terminal-io* "Done, ~a~%" (timing-string begin-time))
        (print-fsm-size composite-fst))))
(collect-fst-alphabets composite-fst)
(setq *last-fsm* composite-fst)
composite-fst))))
```

Source Code Appendix
Section B

```
;;;   LOOKUP and LOOKDOWN
;;;
;;;   Functions for recognizing (lookup) and generating (lookdown) words
;;;   with a lexical transducer.  The lookup function takes as an optional
;;;   argument a second transducer that is used to normalize the string
;;;   to the symbols that match the lower side of the transducer.
;;;

(defun lookup (string &key (lexicon *last-fsm*) (trace-p nil) (pairs-p nil)
                          (transducer *lookup-transducer*))
  ;;; STRING     = the word form to recognize
  ;;; LEXICON    = lexical transducer
  ;;; TRANSDUCER = normalizing transducer (optional)
  (setq *last-fsm* lexicon)
  (if transducer
      (progn
        (setq *lookup-transducer* transducer)
        (transduce2-to-strings
          (parse-string string
                        (or (networkprop transducer :lower-to-upper-net)
                            (progn
                              (make-lookup-transducer transducer)
                              (networkprop transducer :lower-to-upper-net))))
          lexicon transducer :input-side :surface
          :trace-p trace-p :pairs-p pairs-p))
      (transduce-to-strings
        (parse-string string (or (networkprop lexicon :surface-symbols)
                                 (get-symbol-net lexicon #'lower-symbol nil)))
        lexicon :surface :trace-p trace-p
        :pairs-p pairs-p)))

(defun lookdown (string &key (lexicon *last-fsm*) (trace-p nil) (pairs-p nil))
  ;;; STRING = lexical form to generate from
  ;;; LEXICON = lexical transducer
  (setq *last-fsm* lexicon)
  (transduce-to-strings
    (parse-string string (or (networkprop lexicon :lexical-symbols)
                             (get-symbol-net lexicon #'upper-symbol nil)))
    lexicon :lexical :trace-p trace-p :pairs-p pairs-p))

(defun transduce-to-strings (input network input-side
                             &key (trace-p *fsm-trace-p*)
                                  (pairs-p nil))

;; Returns all strings from the opposite side of the transducer
  ;; that map to INPUT, or the input-output pairs if PAIRS-P=T (let ((match-fn (ecase input-side
                    (:surface #'lower-symbol)
                    (:lexical #'upper-symbol)))
        (extract-fn (if pairs-p
                        #'format-label
                        (case input-side
                          (:surface #'upper-symbol)
                          (:lexical #'lower-symbol))))
        (strings *output-strings*)
        (*print-case* :upcase)
        label)
```

```
(declare (special match-fn extract-fn strings label))
(labels ((process
          (path state result)
          (declare (special match-fn extract-fn strings label))
          (if trace-p
              (let ((*print-case* :upcase))
                (fresh-line t)
                (do ((tail *output-list*
                           (or (cdr tail)
                               (cdr (rplacd tail (list nil))))))
                    ((eq tail result) nil)
                  (if (eq (car tail) *epsilon-symbol*)
                      (princ "0" t)
                      (princ (car tail) t))
                  (princ " " t))
                (format t "<= -(~a-)-%" path)))
          (when (and (null path)
                     (state-final state))
            (setq *output-save* strings)
            (setf (fill-pointer (car strings)) 0)
            (with-output-to-string (stream (pop strings))
              (do ((tail *output-list*
                         (or (cdr tail)
                             (cdr (rplacd tail (list nil))))))
                  ((eq tail result))
                (or (eq (car tail) *epsilon-symbol*)
                    (princ (car tail) stream)))))
          (do-arcs (arc state)
            (if (eq (arc-label arc)
                    *epsilon-symbol*)
                (process path (arc-destination arc) result)
                (progn
                  (setq label (funcall match-fn (arc-label arc)))
                  (if (eq label (car path))
                      (process (cdr path) (arc-destination arc)
                               (cdr (rplaca
                                     result
                                     (funcall extract-fn
                                              (arc-label arc))))))
                  (if (or (eq label *epsilon-symbol*)
                          (eq label *one-sided-epsilon*))
                      (process path (arc-destination arc)
                               (cdr (rplaca
                                     result
                                     (funcall
                                      extract-fn
                                      (arc-label arc))))))))))
         (when *output-save*
           (rplacd *output-save* *output-tail*)
           (setq *output-save* nil))
         (process input (network-start-state network) *output-list*)
         (when *output-save*
           (setq *output-tail* (cdr *output-save*))
           (rplacd *output-save* nil)
           *output-strings*)))

(defun transduce2-to-strings (input lexicon transducer
                              &key (input-side :surface)
                                   (trace-p *fsm-trace-p*)
                                   (pairs-p nil))
```

```
;; Returns all strings from the opposite side of the leixon
;; that map to INPUT as mediated by TRANSDUCER. The upper side
;; of the transducer is matched against the lower side of the
;; lexicon, the lower side of the transducer is matched against
;; the input. For example, and <a:A> arc in the transducer allows
;; an upper-case "A" in the input string match a lower-case "a"
;; in the lexicon.

(let ((match-fn (ecase input-side
                  (:surface #'lower-symbol)
                  (:lexical #'upper-symbol)))
      (extract-fn (if pairs-p
                      #'format-label
                      (case input-side
                        (:surface #'upper-symbol)
                        (:lexical #'lower-symbol))))
      (upper-labels (ecase input-side
                      (:surface (networkprop transducer :upper-side-array))
                      (:lexical (networkprop transducer :lower-side-array))))
      (epsilon-matches (state-name
                         (network-start-state
                           (networkprop transducer :lower-to-upper-net))))
      (strings *output-strings*)
      (*print-case* :upcase)
      tr-upper tr-dest)
  (labels
    ((process
       (path lexicon-state transducer-state result repeat-p)
       (if trace-p
           (let ((*print-case* :upcase))
             (fresh-line t)
             (do ((tail *output-list*
                        (or (cdr tail)
                            (cdr (rplacd tail (list nil))))))
                 ((eq tail result) nil)
               (if (eq (car tail) *epsilon-symbol*)
                   (princ "0" t)
                   (princ (car tail) t))
               (princ " " t))
             (format t "<- -{-a-} -s -s-%" path lexicon-state
                     transducer-state)))
       (when (and (null path)
                  (state-final lexicon-state)
                  (state-final transducer-state))
         (setq *output-save* strings)
         (setf (fill-pointer (car strings)) 0)
         (with-output-to-string (stream (pop strings))
           (do ((tail *output-list*
                      (or (cdr tail)
                          (cdr (rplacd tail (list nil))))))
               ((eq tail result))
             (or (eq (car tail) *epsilon-symbol*)
                 (princ (car tail) stream)))))
       (if (null (cdr result))
           (rplacd result (list nil)))
       (let ((epsilons-done-p nil))
         (do-arcs (lex-arc lexicon-state)
           (if (eq (arc-label lex-arc)
                   *epsilon-symbol*)
```

```
              (unless repeat-p
                (process path (arc-destination lex-arc)
                         transducer-state result nil))
              (let ((lex-label (funcall match-fn
                                        (arc-label lex-arc)))
                    (output-label (funcall extract-fn
                                           (arc-label lex-arc))))
                (when (or (eq lex-label *epsilon-symbol*)
                          (eq lex-label *one-sided-epsilon*))
                  (unless repeat-p
                    (process path (arc-destination lex-arc)
                             transducer-state
                             (cdr (rplaca result output-label))
                             nil)))
                (dolist (label-no (car path))
                  (setq tr-dest
                        (aref (state-arc-set transducer-state)
                              label-no))
                  (when tr-dest
                    (setq tr-upper (aref upper-labels label-no))
                    (if (eq tr-upper *epsilon-symbol*)
                        (unless epsilons-done-p
                          (process (cdr path)
                                   lexicon-state tr-dest
                                   result t))
                        (when (eq tr-upper lex-label)
                          (process
                            (cdr path)
                            (arc-destination lex-arc)
                            tr-dest
                            (cdr (rplaca result output-label))
                            nil)))))
                (setq epsilons-done-p t)
                (unless (arc-visited lex-arc)
                  (let ((eps-arc-p nil))
                    (dolist (label-no epsilon-matches)
                      (when (eq lex-label
                                (aref upper-labels label-no))
                        (setq eps-arc-p t)
                        (when (setq tr-dest
                                    (aref (state-arc-set
                                            transducer-state)
                                          label-no))
                          (process
                            path (arc-destination lex-arc)
                            tr-dest
                            (cdr (rplaca
                                   result
                                   output-label))
                            nil))))
                    (unless eps-arc-p
                      (setf (arc-visited lex-arc) t)))))))))
      (when (null (state-arc-set lexicon-state))
        (dolist (label-no (car path))
          (setq tr-upper (aref upper-labels label-no))
          (when (and (eq tr-upper *epsilon-symbol*)
                     (setq tr-dest
                           (aref (state-arc-set transducer-state)
                                 label-no)))
            (process (cdr path) lexicon-state tr-dest result t))))))
```

```
           (when *output-save*
              (rplacd *output-save* *output-tail*)
              (setq *output-save* nil))
           (process input (network-start-state lexicon)
                    (network-start-state transducer) *output-list* nil)
           (when *output-save*
              (setq *output-tail* (cdr *output-save*))
              (rplacd *output-save* nil)
              *output-strings*))))

(defun parse-string (string &optional (symbol-net *default-symbol-net*))
  ;; Support function for LOOKUP and LOOKDOWN.
  ;; Converts STRING to a sequence of symbols in SYMBOL-NET.  SYMBOL-NET
  ;; should be constructed using MAKE-SYMBOL-NET.
  (let ((start-state (network-start-state symbol-net))
        (last-position (1- (length string)))
        next-state result)
    (when (consp *input-save*)
       (rplacd *input-save* *input-tail*))
    (labels ((get-symbol
                (state store)
                (when (and (state-name state)
                           (not (eq state start-state)))
                   (rplaca store (state-name state))))
             (advance
                (state position store)
                (if (> position last-position)
                    (get-symbol state store)
                    (or (and (state-arc-set state)
                             (setq next-state
                                   (aref (state-arc-set state)
                                         (char-int
                                           (char string position))))
                             (advance next-state (1+ position) store))
                        (and (get-symbol state store)
                             (advance start-state position
                                      (or (cdr store)
                                          (cdr (rplacd store (list nil))))))))))
      (if (setq result
                (advance start-state 0 *input-list*))
          (progn
            (setq *input-save* result)
            (setq *input-tail* (cdr result))
            (rplacd result nil)
            *input-list*)
          (progn
            (format t "~&;;; Cannot parse ~s~%" string))))))

(defun get-symbol-net (network match-fn grep-p)
  ;;; Support function for LOOKUP and LOOKDOWN (called once from
  ;;; PARSE-STRING).
  (let ((property (if (eq match-fn #'upper-symbol)
                      (if grep-p
                          :lexical-grep-symbols
                          :lexical-symbols)
                      (if (eq match-fn #'lower-symbol)
                          (if grep-p
                              :surface-grep-symbols
                              :surface-symbols)
```

```
                              (if grep-p
                                  :grep-symbols
                                  :symbols)))))
        (or (networkprop network property)
            (let ((upper-sigma (networkprop network :upper-sigma))
                  (lower-sigma (networkprop network :lower-sigma))
                  alphabet symbol-net)
              (if (eq match-fn #'upper-symbol)
                  (progn
                    (unless upper-sigma
                      (multiple-value-setq
                        (upper-sigma lower-sigma)
                        (upper-and-lower-sigma network)))
                    (setq alphabet upper-sigma))
                (if (eq match-fn #'lower-symbol)
                    (progn
                      (unless lower-sigma
                        (multiple-value-setq
                          (upper-sigma lower-sigma)
                          (upper-and-lower-sigma network)))
                      (setq alphabet lower-sigma))
                  (setq alphabet (sigma network))))
              (if grep-p
                  (setq symbol-net
                        (make-symbol-net
                         (remove *other-symbol* alphabet :test #'eq)
                         :escape-char *reg-exp-escape-char*
                         :special-chars *special-grep-chars*
                         :white-space-chars '(#\Space #\Tab #\Newline)))
                (setq symbol-net (make-symbol-net alphabet)))
              (set-networkprop network property symbol-net)))))

(defun make-symbol-net (alphabet &key (target-alphabet nil)
                                      (escape-char nil)
                                      (special-chars nil)
                                      (white-space-chars nil))
  (declare (special escape-char special-chars))
  (let ((network (make-fsm))
        (*print-case* :upcase)
        label)
    (declare (special network label))
    (labels ((add-escapes
              (state)
              (declare (special network escape-char special-chars label))
              (let ((escape-state nil))
                (do-arcs (arc state)
                  (let ((next-state (arc-destination arc)))
                    (if (and (eq state (network-start-state network))
                             (or (eql (arc-label arc) escape-char)
                                 (member (arc-label arc) special-chars
                                         :test #'eql)))
                        (let ((new-arc (make-arc :label (arc-label arc)
                                                 :destination
                                                 (arc-destination arc))))
                          (when (null escape-state)
                            (setq escape-state (make-state))
                            (push escape-state
                                  (network-states network)))
                          (setf (arc-destination arc) escape-state)
                          (setf (arc-label arc) escape-char)
```

```
                            (push-arc new-arc escape-state))
                      (let ((new-arc1 (make-arc :label escape-char))
                            (new-arc2 (make-arc :label (arc-label arc)
                                                :destination
                                                (arc-destination arc))))
                        (when (null escape-state)
                          (setq escape-state (make-state))
                          (push escape-state
                                (network-states network)))
                        (setf (arc-destination new-arc1) escape-state)
                        (push-arc new-arc1 state)
                        (push-arc new-arc2 escape-state)))
                  (add-escapes next-state))))))
    (setf (state-name (network-start-state network)) nil)
    (do ((symbol-tail alphabet (cdr symbol-tail))
         (target-tail (or target-alphabet alphabet) (cdr target-tail)))
        ((null symbol-tail) nil)
      (let ((final-arc
              (add-string-to-fsm (format nil "~a" (car symbol-tail))
                                  network :label-type :character
                                  :new-final-state-p t))
            (target (car target-tail)))
        (if (null target)
            (warn "No target symbol for ~s" (car symbol-tail))
            (setf (state-name (arc-destination final-arc)) target))))
    (when escape-char
      (add-escapes (network-start-state network)))
    (dolist (symbol special-chars)
      (let ((final-arc (add-string-to-fsm (string symbol) network
                                          :label-type :character
                                          :new-final-state-p t)))
        (setf (state-name (arc-destination final-arc))
              symbol)))
    (let ((start-state (network-start-state network))
          (fluff white-space-chars))
      (dolist (char fluff)
        (when (do-arcs (arc start-state t)
                (when (eql (arc-label arc) char)
                  (warn "~s cannot be a white space character!" char)
                  (setq white-space-chars
                        (remove char white-space-chars))
                  (return nil)))
          (push-arc (make-arc :label char :destination start-state)
                    start-state))))
    (dolist (state (network-states network))
      (when (state-final state)
        (dolist (char white-space-chars)
          (push-arc (make-arc :label char :destination state)
                    state))))
    (dolist (state (network-states network))
      (when (arc-p (state-arc-set state))
        (let ((vector (make-array 256)))
          (do-arcs (arc state)
            (setf (aref vector (char-int (arc-label arc)))
                  (arc-destination arc)))
          (setf (state-arc-set state) vector))))
    network))
```

Source Code Appendix
Section C

```
!======================================================================
!                    Simple Text Normalization rules
!======================================================================

! In these rules the upper side is the user input, the lower side is
! the NEW dictionary.  The alphabet consists of ASCII character codes.
! Only few of the definitions are presently used in the rules.
! The effect of the alphabet declarations is that all control characters,
! numbers, punctuation characters, and other non-alphabet symbols
! are deleted.  Upper case letters are converted to the corresponding
! lower case letters.

Declarations
    Boundary - #

Alphabet
    0:32  1:0  2:0  3:0  4:0  5:0  6:0  7:0  8:0  9:0  9:32  10:0  10:32  11:0
    12:0  13:0  13:32  14:0  15:0  16:0  17:0  18:0  19:0  20:0  21:0
    22:0  23:0  24:0  25:0  26:0  27:0  28:0  29:0  30:0  31:0

32:0  32  33  34  35:0  36  37  38:0  39  39:0  40:0  41:0
    42:0  43:0  44  44:0  45:0  45:32  46  47

48  49  50  51  52  53  54  55  56  57

58  59  60:0  61:0  62:0  63  64:0

!   65  66  67  68  69  70  71  72  73  74  75  76  77  78  79  80
!   81  82  83  84  85  86  87  88  89  90

91:0  92:0  93:0  94:0  95:0  96:0

97  98  99  100  101  102  103  104  105  106  107  108  109
    110  111  112  113  114  115  116  117  118  119  120  121  122

123:0  124:0  125:0  126:0  127:0

65:97  66:98  67:99  68:100  69:101  70:102  71:103  72:104  73:105
    74:106  75:107  76:108  77:109  78:110  79:111  80:112  81:113
    82:114  83:115  84:116  85:117  86:118  87:119  88:120  89:121  90:122  ;

Sets
!                0  1  2  3  4  5  6  7  8  9
!   Numeral  -  48 49 50 51 52 53 54 55 56 57 ;

!                A  B  C  D  E  F  G  H  I  J  K  L  M  N
!   CapitalLetter - 65 66 67 68 69 70 71 72 73 74 75 76 77 78

!                O  P  Q  R  S  T  U  V  W  X  Y  Z
!                79 80 81 82 83 84 85 86 87 88 89 90 ;

!                a  b  c  d  e  f  g  h  i  j  k  l
!   SmallLetter - 97 98 99 100 101 102 103 104 105 106 107 108

!                m  n  o  p  q  r  s  t  u  v  w  x
!                109 110 111 112 113 114 115 116 117 118 119

!                y  z
!                120 121 122 ;
```

Source Code Appendix
Section C

```
!       SpecialSymbol = 39 43 44 45 46 47 ;

!       NonSpecialSymbol = 33 34 35 36 37 38 40 41 42
!                          58 59 60 61 62 63 64
!                          91 92 93 94 95 96
!                          123 124 125 126 ;

Tab = 9 ;
        Linefeed = 10 ;
        Newline = 13 ;

Linebreak = 10 13 ;

Whitespace = 9 10 13 32 ;

Space = 32 ;
        ExclamationMark = 33 ;
        DoubleQuote = 34 ;
        SingleQuote = 39 ;
        Plus = 43 ;
        Comma = 44 ;
        Dash = 45 ;
        Period = 46 ;
        Slash = 47 ;
        Colon = 58 ;
        SemiColon = 59 ;
        QuestionMark = 63 ;
        SmallD = 100 ;
        SmallL = 108 ;
        SmallN = 110 ;
        SmallO = 111 ;
        SmallS = 115 ;
        SmallT = 116 ;

OpeningParen = 40 91 123 ;
        ClosingParen = 41 93 125 ;

Definitions
        Blank = :0* :Space :0* ;
        Punctuation = :SingleQuote | :SemiColon | :Comma | :Period |
                      :QuestionMark | :ExclamationMark | :DoubleQuote |
                      :Colon | :Slash ;
!       Punctuation = :SemiColon | :Comma | :Period ;
        Letter = CapitalLetter | SmallLetter ;
        Quote = :SingleQuote | :DoubleQuote ;

Rules

"1. Apostrophe-to-e"        ! Converts the "n't" to "not".

39:111 <=> :SmallN _ :SmallT ;

"2. Save apostrophe"        ! Keeps the apostrophe in morphemes like
```

Source Code Appendix
Section C

```
                                    ! "I'll", "he's", 'he'd'

39 <=> Letter 0:" _ [:SmallD | :SmallL :SmallL | :SmallS] Blank /

"3. Introduce space"      ! Introduce a space before and after
                             ! punctuation markers and before a cliticized
                             ! "n't" where the vowel has been restored
                             ! but not in an initial or final position 0:32 <=>             \Blank  _  :SmallN SingleQuote:SmallO
   :SmallT /
                    Letter | Punctuation  _ Quote /
                              Quote       _ Numeral /
                    :SmallLetter :O"      _ Punctuation /
             Punctuation - :SingleQuote   _ :SmallLetter /
                              Numeral     _ Punctuation \Numeral /

"4. Delete extra spaces and tabs"   ! Tabs and spaces are deleted after
                                       ! a blank.

[Tab:0 | Space:0] <=> Blank :0" _ /

"5. Delete Linebreak"               ! Delete a line break if it follows
                                       ! a hyphen or a blank
       Linebreak:0 <=> [Dash: | Blank] :0" _ /

"6. Delete hyphen"                  ! Delete a dash at the end of a line
       45:0 <=> _ Linebreak: /

"7. Delete comma"                   ! Delete comma between numerals,
                                       ! as in 5,000.
       44:0 <=> Numeral _ Numeral /
```

What is claimed is:

1. A computerized information retrieval or text indexing device, comprising:
   (a) a database stored on a computer readable medium, said database comprising a data structure for representing stem-variant relations of a language, said data structure comprising a finite state transducer (FST) encoding along a plurality of branches sets of ordered-pairs of upper and lower strings wherein the upper string of each pair is a valid word stem and the lower string of each pair is a valid word variant, said data structure being constructed such that traversing a branch of the FST via the upper string of a pair will enable retrieval of the lower string of the pair, or traversing a branch of the FST via the lower string of a pair will enable retrieval of the upper string of the pair,
   (b) processing means connected to the computer readable medium, in response to a user query inputting a word incorporating a stem or a variant, for traversing the data structure FST searching for a complete path through an FST branch having a lower string matching the query word, said processing means further comprising means in response to finding a complete path through a branch for outputting the upper string stem represented by that branch and corresponding to the query word or an identification of a document containing the same, or for outputting another word variant represented by that branch and having the same stem as the query word or an identification of a document containing the same.

2. The device of claim 1, wherein the FST transducer comprises a merger of a first transducer derived from a finite list of irregular word pairs and a second transducer derived from regular linguistic rules and stems by computing the identity transducer for the complement of the domain of the first transducer, precomposing the identity transducer with the second transducer, and then unioning the result with the first transducer.

3. The device of claim 2, wherein the second transducer comprises a merger of a third transducer derived from a list of regular linguistic rules and a fourth transducer derived from a list of allowable stems of the language.

4. The device of claim 3, wherein the second transducer was produced using composition and intersecting algorithms to combine the third and fourth transducers.

5. The device of claim 1, further comprising means for backtracking through the found branch to where the stem begins to identify another stem of a word variant, and means for traversing the data structure FST searching for a complete path through a second branch of the FST having the same another stem and outputting the word variant represented by the second branch.

6. The device of claim 1, wherein the FST comprises branches of only stem/variant pairs.

7. The device of claim 1, wherein the FST incorporates systematic inflectional and derivational word alterations describable by linguistic rules, and wherein the FST incorporates compiled versions of said linguistic rules.

8. The device of claim 1, further comprising memory means, said database being stored in said memory means.

9. The device of claim 1, wherein the FST is compressed.

10. The device of claim 1, wherein the FST comprises a merger of a first transducer derived from a list of regular linguistic rules and a second transducer derived from a list of allowable stems of the language, the FST being produced using composition and intersecting algorithms to combine the first and second transducers.

11. A data structure stored on a computer readable medium used in a computerized device executing an information retrieval or text indexing application program,
   said data structure representing stem-variant relations of a language, said data structure comprising a single combined finite state transducer (FST),
   said FST comprising a plurality of branches defining a plurality of FST paths from a start state via transitions to different end states, each branch forming a path from the start state to the end state representing a string, each of said transitions representing an ordered pair comprising one character or null symbol in an upper string constituting a valid word stem and one character or null symbol in a lower string constituting a valid word variant of said word stem,
   said single FST comprising the merger of a first FST derived from a first list of irregular word stem-variant pairs constituting a morpheme lexicon and of a second FST derived from at least a second list of linguistic rules governing the addition of affixes to word stems to form regular word variants of said stems,
   said single FST mapping stems of words obeying the linguistic rules to variants of said stems except where the word is an irregular word in the morpheme lexicon and is overridden by the latter,
   said data structure being constructed such that traversing a branch of the FST via the upper string of a pair will enable retrieval by the program of the lower string of the pair, or traversing a branch of the FST via the lower string of a pair will enable retrieval by the program of the upper string of the pair.

12. The data structure of claim 11, wherein the second FST comprises a merger of a third FST derived frown the second list of linguistic rules and a fourth FST derived from a third list of allowable stems of the language.

13. The data structure of claim 12, wherein the second FST was produced by using composition and intersecting algorithms to combine the third and fourth FSTs.

14. The data structure of claim 11, wherein the merger was carried out by computing the identity transducer for the complement of the domain of the first FST, precomposing the identity transducer with the second FST, and then unioning the result with the first FST.

15. The data structure of claim 11, wherein the data structure is a compressed FST.

16. A method of using a database for a language for word indexing and retrieval from valid words in that language stored in the database with the aid of a single FST that maps via word-stem pairs the surface form of valid words for the language along a lower string of the pair to its lexical stem or stems along an upper string of the pair, the database being stored on a computer readable medium, the method comprising the steps of:
   (a) inputting a query containing a valid word in the language requesting identification of any related words in the database or of a document containing such words,
   (b) operating the FST upward by traversing a branch of the FST via the lower string of the pair to obtain the query word's stem or stems and then scanning the database looking for words with a matching stem, or
   (c) operating the FST upwards by traversing a branch of the FST via the lower string of the pair to obtain the query word's lexical stem or stems, then operating the FST downward by traversing a branch of the FST containing the lexical stem or stems via the upper string of the pair to generate all variants of the lexical stem or stems and then scanning the database with each of the variants searching for a match.

17. The method of claim 16 wherein, if a match is found, outputting the match or an identification of a document containing the match.

18. A computerized language processing device, comprising:
   (a) a database stored on a computer readable medium, said database comprising a data structure for representing stem-variant relations and variant-parts of speech-affix relations of a language, said data structure comprising a combined finite state transducer (FST) encoding along a plurality of branches sets of ordered-pairs of upper and lower labels and parts-of-speech or affix tags/label wherein the upper string of each pair is a character of a valid word stem or a part-of-speech or affix tag, and the lower string of each pair is a character of a valid word variant or nul, said data structure being constructed such that traversing a branch of the FST via the upper pair will enable retrieval of the lower pair, or traversing a branch of the FST via the lower pair will enable retrieval of the upper pair, (b) processing means connected to the computer readable medium, in response to a user query inputting a word incorporating a stem or a variant, for traversing the data structure FST searching for a complete path through an FST branch having a lower pair matching the query word, said processing means further comprising means in response to finding a complete path through a branch for outputting the upper string stem or part-of-speech represented by that branch and corresponding to the query word or an identification of a document containing the same, or for outputting another word variant represented by that branch and having the same stem as the query word or an identification of a document containing the same.

19. A data structure stored on a computer readable medium used in a computerized device executing a language processing application program, said data structure representing stem-variant relations and variant-parts of speech-affix relations as tags of a language, said data structure comprising a single combined finite state transducer (FST), said FST comprising a plurality of branches defining a plurality of FST paths from a single start state via transitions to different end states, each branch forming a path from the start state to the end state representing a string or a string and a tag, each of said transitions representing an ordered pair comprising one character or null symbol in an upper string constituting a valid word stem or a label representing a part-of-speech or affix relation and one character or null symbol in a lower string constituting a valid word variant of said word stem, said single FST comprising the merger of a first FST derived from a first list of irregular word stem-variant pairs constituting a morpheme lexicon and of a second FST derived from at least a second list of linguistic rules, said data structure being constructed such that traversing a branch of the FST via the upper string of a pair will enable retrieval by the program of the lower string of the pair, or traversing a branch of the FST via the lower string of a pair will enable retrieval by the program of the upper string of the pair or the upper string with the tag.

20. The data structure claim 19, wherein the second FST comprises a merger of a third FST derived from the second list of linguistic rules and a fourth FST derived from a third list of allowable stems of the language.

21. The data structure of claim 20, wherein the second FST was produced by using composition and intersecting algorithms to combine the third and fourth FSTs.

22. A method of using a database in a language for word indexing and retrieval from documents in that language or for other language processing applications with the aid of a single FST that maps via word-stem pairs the surface form of valid words in the language along a lower string of the pair to lexical counterpart forms along an upper string of the pair, the database being stored on a computer readable medium, the method comprising the steps of:

(a) inputting a query containing a valid word in the language requesting identification of any related words in the database or of a document containing such words or of the query word's part of speech, (b) operating the FST upward by traversing a branch of the FST via the lower string of the pair to obtain the query word's stem and then scanning the database looking for a matching stem, or (c) operating the FST upwards by traversing a branch of the FST via the lower string of the pair to obtain the query word's lexical counterpart, then operating the FST downward by traversing a branch of the FST containing the lexical counterpart via the upper string of the pair to generate all variants of the lexical counterpart and then scanning the database with each of the variants searching for a match, or (d) operating the FST upward by traversing a branch of the FST via the lower string of the pair to obtain an identification of the query word's part-of-speech.

23. The method of claim 22 wherein, if a match is found, outputting the match or an identification of a document containing the match.

24. A computerized language processing device, comprising:

(a) a database stored on a computer readable medium, said database comprising a data structure for representing stem-variant relations and variant-parts of speech-affix relations of a language, said data structure comprising a combined finite state machine (FSM) converted from finite state transducers (FST) each encoding along a plurality of branches sets of ordered-pairs of upper and lower labels and parts-of-speech or affix tags label wherein the upper string of each pair is a character of a valid word stem or a part-of-speech or affix tag or null, and the lower string of each pair is a character of a valid word variant or null, each of said FST transitions from an original to a destination state being replaced in the FSM with an odd-numbered transition labelled to represent the upper string label or tag or null to a new state followed by an even-numbered transition labelled to represent the lower string character or null from the new state to the destination state, said data structure being constructed such that traversing a branch of the FSM via the odd-numbered transition will enable retrieval of the lower string character, or traversing a branch of the FSM via the even-numbered transition will enable retrieval of the upper string label or tag, (b) processing means connected to the computer readable medium, in response to a user query inputting a word incorporating a stem or a variant, for traversing the data structure FSM searching for a complete path through an FSM branch having a lower character matching that of the query word, said processing means further comprising means in response to finding a complete path through a branch for outputting the upper string stem or part-of-speech represented by that branch and corresponding to the query word or an identification of a document containing the same, or for outputting another word variant represented by that branch and having the same stem as the query word or an identification of a document containing the same.

* * * * *